US006885907B1

(12) United States Patent
Zhang et al.

(10) Patent No.: US 6,885,907 B1
(45) Date of Patent: Apr. 26, 2005

(54) REAL-TIME SYSTEM AND METHOD OF MONITORING TRANSIENT OPERATIONS IN CONTINUOUS CASTING PROCESS FOR BREAKOUT PREVENTION

(75) Inventors: Yale Zhang, Dundas (CA); Michael S. Dudzic, Ancaster (CA)

(73) Assignee: Dofasco Inc., Hamilton (CA)

( * ) Notice: Subject to any disclaimer, the term of this patent is extended or adjusted under 35 U.S.C. 154(b) by 0 days.

(21) Appl. No.: 10/854,217

(22) Filed: May 27, 2004

(51) Int. Cl.$^7$ .......................... G06F 19/00; B22D 11/16
(52) U.S. Cl. ....................... 700/146; 700/31; 164/151.5
(58) Field of Search .............................. 700/29, 30, 31, 700/47, 51, 67, 73, 78–80, 108, 145–147, 150; 164/150.1, 151.4, 151.5, 152, 155.6, 451–455, 458

(56) References Cited

U.S. PATENT DOCUMENTS

| | | | |
|---|---|---|---|
| 3,478,808 A | | 11/1969 | Adams |
| 4,235,276 A | | 11/1980 | Gilles et al. |
| 4,949,777 A | | 8/1990 | Itoyama et al. |
| 5,020,585 A | | 6/1991 | Blazek et al. |
| 5,257,206 A | | 10/1993 | Hanson |
| 5,359,531 A | | 10/1994 | Iwamoto et al. |
| 5,548,520 A | | 8/1996 | Nakamura et al. |
| 5,600,758 A | | 2/1997 | Broese et al. |
| 5,659,667 A | | 8/1997 | Buescher et al. |
| 5,819,258 A | | 10/1998 | Vaithyanathan et al. |
| 5,904,202 A | | 5/1999 | Adamy |
| 5,949,678 A | * | 9/1999 | Wold et al. .................... 700/83 |
| 6,179,041 B1 | | 1/2001 | Pleschiutschnigg |
| 6,212,438 B1 | | 4/2001 | Reine |
| 6,564,119 B1 | * | 5/2003 | Vaculik et al. ............... 700/146 |
| 2003/0200064 A1 | * | 10/2003 | Bay et al. ....................... 703/2 |
| 2004/0172153 A1 | * | 9/2004 | Zhang et al. ................ 700/146 |

OTHER PUBLICATIONS

Dudzic, "Multivariate Statistical Monitoring Of A Continuous Steel Slab Caster" May 8–10, 2002, American Control Conference, vol. 1, pp. 600–601.*

European Search Report for EP1428598, Mar. 11th, 2004, EPO Online, pp. 1–2.*

Geladi and Kowalski, Partial Least–Squares Regression: A Tutorial, Analytica Chimica Acta, 185, (1986)1–17, Elsevier Science Publishers B.V. Amsterdam—The Netherlands.

Kourti et al, Analysis, monitoring and fault diagnosis of batch processes using multiblock and multiway PLS, J. Proc. vol. 5, No. 4, pp 77–284, (1995).

Nelson et al, Missing data methods in PCA and PLS: Score calculations with incomplete observations, Chemometrics & Intelligent Laboratory System 35 (1996) 45–65.

Nomikos et al, Monitoring Batch Processes Using Multiway Principal Component Analysis, AlChE Journal Aug. 1994, vol. 40, No. 8.

Nomikos et al, Multivariate SPC Charts for Monitoring Batch Processes, 41–59, Technometrics, Feb. 1995, vol. 37, No. 1, American Statistical Assoc.

* cited by examiner

*Primary Examiner*—Leo Picard
*Assistant Examiner*—Sean Shechtman
(74) *Attorney, Agent, or Firm*—Ingrid E. Schmidt

(57) ABSTRACT

A real-time system and method for online monitoring a transient operation in a continuous casting process. The transient operation refers to, but is not limited to, submerged entry nozzle changes, flying tundish changes, product grade changes, etc. This invention treats the aforementioned transient operations as batch processes and utilizes multiway principal component analysis to develop a multivariate statistical model to characterize normal process transitions based on carefully selected historical process data. Such a model is used by an online monitoring system to determine if a continuous caster transient operation is normal. This monitoring system can further be used to predict an impending breakout, one type of catastrophic process failures which may occur in a continuous casting process, during the transient operation. Process variables that are most likely related to the predicted breakout are identified by the system such that appropriate control actions can be taken to prevent an actual breakout occurrence.

29 Claims, 17 Drawing Sheets synchronization scales in D-stage and U-stage

REAL-TIME SYSTEM AND METHOD OF MONITORING TRANSIENT OPERATIONS IN CONTINUOUS CASTING PROCESS FOR BREAKOUT PREVENTION

TECHNICAL FIELD

The present invention relates generally to a continuous casting process, and more particularly, to a real-time system and method of monitoring transient operations in a continuous casting process, including submerged entry nozzle (SEN) changes, flying tundish changes, product grade changes, etc., to predict and prevent mold breakouts, which are catastrophic process failures in a continuous casting process. This system generates alarms to indicate an impending breakout during one of the aforementioned transient operations of the continuous caster and identifies the process variables that are most likely related to the predicted breakout such that appropriate control actions can be taken automatically or manually by operators to reduce the possibility of breakout occurrence.

BACKGROUND ART

Continuous Casting Process

Continuous casting, in the steel-making industry, is the process whereby molten steel is solidified into a semifinished product such as a billet, bloom, or slab for subsequent rolling in a hot strip mill or a finishing mill. This process is achieved through a well-designed casting machine, known as a continuous caster.

FIG. 1 shows a schematic diagram of a continuous caster according to the prior art, which comprises the following key elements: a ladle turret 20, a ladle 22, a tundish 24 with a stopper-rod 26, a submerged entry nozzle (SEN) 28, a water-cooled copper mold 30, a roller containment section with additional cooling chambers 32, a straightener withdrawal unit 34 and torch severing equipment 36.

Molten steel from an electric arc furnace or a basic oxygen furnace is tapped into a ladle and shipped to the continuous caster. This batch of steel, referred to as a heat, will be used to cast several slabs, blooms or billets. The ladle is placed into the casting position above the tundish 24 by the turret 20. The steel is poured into the tundish 24, and then into the water-cooled copper mold 30 through the SEN 28, which is used to regulate the steel flow rate and provide precise control of the steel level 38 in the mold. As the molten steel moves down the mold 30 at a controlled rate (referred to as casting speed), the outer shell 39 of the steel becomes solidified to produce a steel strand 40. Upon exiting the mold 30, the strand 40 enters a roller containment section and cooling chamber in which the solidifying strand is sprayed with water to promote solidification. Once the strand is fully solidified and has passed through the straightener withdrawal unit 34, it is cut to the required length by the severing unit 36 and becomes a slab 46.

Special Casting Practice

Referring to the casting speed profile 50 shown in FIG. 2, the entire operation sequence of a continuous caster consists of a brief start-up operation 52, followed by a prolonged continuous, run-time production operation 54, and finally a shut-down operation 56. The main operational issues in continuous casting processes relate to achieving a stable operation following start-up, and then maintaining stability. In order to improve casting process efficiency and flexibility, it is expected to continuously cast as many heats as possible in one single casting sequence. For this purpose, certain special casting practices need to be performed during the continuous, run-time production operation. For example, SEN changes and flying tundish changes are activated to replace an SEN or tundish in current operation when their service time expires; product grade changes require the insertion of a product grade separator so as to cast different grades of steel as successive heats. All these special casting practices, referred to as transient operations in this invention, require the casting speed to be decreased. The resulting process trajectories share a common feature that, during an SEN change, a flying tundish change or a product grade change, the casting speed is first slowed down considerably (approximately 0.6 meters/minute for an SEN change and 0.1 meters/minute for a flying tundish change or product grade change); then it remains unchanged for a short period of time, during which the consumed SEN/tundish is replaced or a product grade separator is inserted, in an automatic or manual fashion; and finally the casting speed is ramped up gradually back to its normal operating conditions over several minutes. The effect on the casting speed profile during an SEN change 58 and a flying tundish change 60 are shown in FIG. 2. It is worth noting that any improper transient operations may increase risks of damaging the steel strand and causing a catastrophic breakout as described below.

Breakout and its Prevention

A well-known problem associated with the continuous caster, is that solidifying steel is prone to tears in the strand shell 39 FIG. 1 due to a variety of causes including friction, inclusion, insufficient or imperfect solidification, etc. and this causes a breakout such that molten steel breaks out of the strand shell immediately beneath the mold, resulting in an emergency stop cast. A breakout may occur during a start-up operation, known as a start-cast breakout, or during the following run-time operation, known as a run-cast breakout, or during one of the aforementioned transient operations, known as a transient-cast breakout. Based on some statistics of plant operations, for a typical, fully operational continuous caster, more than 50% of total breakouts are due to improper transient operations such as SEN changes, flying tundish changes, etc. These breakouts are of major concern in the steel-making industry, because they diminish the reliability and efficiency of the production process, create substantial costs due to production delays and destruction of equipment, and most importantly, pose significant safety risks to plant operators. Therefore, the ability to prevent breakouts from happening utilizing engineering expertise and analytical methods can provide excellent benefits to the continuous casting process.

Although there have already been some methods and systems developed to predict run-cast breakouts in the prior art, breakouts occurring in transient operations and their prevention has received very little attention in both academia and industry. It is important, then, to be able to predict these breakouts in advance such that they can be avoided by taking appropriate control actions.

According to the prior art in the area of predicting breakouts in continuous casting processes, there are two different types of methods. One is the pattern-matching method, for example, the well-known sticker detection method, which develops comprehensive rules to characterize the patterns in the mold C, temperatures prior to the incidence of a breakout based on past casting operation experiences. If such patterns are recognized in the current casting operation, then there is a high likelihood that a breakout will occur. The relevant systems based on this type of method are described by Yamamoto et al in U.S. Pat. No. 4,556,099, Blazek et al in U.S. Pat. No. 5,020,585, Nakamura et al in U.S. Pat. No. 5,548,520, and by Adamy in U.S. Pat. No. 5,904,202. In addition, following the similar philosophy of the pattern-matching method, Frtiz-Peter Pleschiutschnigg described a method in U.S. Pat. No. 6,179,041 B1 for continuous caster breakout early-reorganization, which uses a comparison of oscillation measurements with breakout-relevant signals to recognize a breakout tendency. The other method is a multivariate statistical method described by Vaculik et al in U.S. Pat. No. 6,564,119, where a principal component analysis (PCA) model is built using an extended set of process measurements, beyond the standard mold temperatures, to model the normal operation of casting processes; certain statistics are then calculated by the model to detect exceptions to normal operation in the current casting operation and to predict potential breakouts. Both of these methods, however, are focused on predicting the run-cast breakouts, and won't work due to some technical difficulties when they are applied to the transient-cast breakouts. The biggest obstacle for these methods is that they are not able to deal with significant changes of process dynamics during transient operations.

Multivariate SPC for Batch Processes

The applicant is also aware of prior art in the use of multivariate statistical process control (SPC) technology for batch process monitoring and fault diagnosis in other fields. Examples of methods and industrial applications of monitoring a batch process using multivariate SPC technology are described by MacGregor and his co-workers in AIChE Journal, volume 40, 1994, Journal of Process Control, volume 5, 1995. There is no application of such multivariate SPC technology to continuous caster transient operations described in the patent literature.

SUMMARY

To summarize, real-time systems and methods for monitoring continuous caster transient operations such as SEN changes, flying tundish changes, product grade changes, etc., and predicting transient-cast breakouts using multivariate SPC technology have not been taught to date.

DISCLOSURE OF INVENTION

This invention is a real-time system for monitoring transient operations of a continuous caster, including but not limited to, SEN changes, flying tundish changes and product grade changes, based on the use of one of multivariate statistical process control methods, Multi-way Principal Component Analysis (MPCA), and the associated method to develop such a system. The system is able to provide real-time indications of process health when a transient operation evolves, predict an impending transient-cast breakout and identify the process variables that are most likely related to the predicted breakout. Additional aspects of the invention deal specifically with process trajectory synchronization, MPCA model development, missing data handling and real-time computer system implementation not found in the prior art.

In accordance with this invention, a new transient operation of a continuous caster is treated as a batch process and monitored by comparing it to the corresponding normal operation, which is benchmarked by a multivariate statistical model using selected historical operation data. If the new operation is statistically different from the benchmark, then alarms are generated to indicate an impending transient-cast breakout or other process abnormalities. At the same time, the process variables that lead to process excursions from the normal operation are identified as the most likely causes of the predicted breakout by a set of contribution plots. The model is built using MPCA technology to characterize the operation-to-operation variance in a reduced dimensional space (also known as latent variable space) based on a large number of process trajectories from past normal transient operations. The process trajectories represent the changes of an extended set of process measurements, including the mold temperatures, casting speed, stopper-rod position, calculated heat flux and so forth, within a transient operation. The data in these trajectories exhibit a time-varying and highly auto-correlated structure, and the use of the MPCA technology allows these data to be modeled. The prior art based on normal PCA technology could not handle such data and is therefore restricted to be applied to the caster run-time operation.

In this invention, the duration of a transient operation in a continuous caster is defined by the combination of the casting speed and the casting strand length. It is divided into two stages, where the evolution of the first stage, named D-stage, is characterized by a continuously decreasing casting speed; and the evolution of the second stage, named U-stage, is characterized by a monotonically increasing strand length. For a given transient operation, its process trajectories in the above pre-defined duration are synchronized by interpolating them based on a set of synchronization scales. The synchronization scales are defined by the casting speed in the D-stage and by the casting strand length in the U-stage, respectively, such that process trajectories of different transient operation can be aligned with respect to them, and the normal transient operations can be captured by the multivariate statistical model to act as a historical benchmark for monitoring a new transient operation. In most cases, data will be missing in the synchronized process trajectory due to the above synchronization scheme being applied. The invention contains a functionality to handle such missing data in both calculations of statistical model development and transient operation online monitoring.

The invention includes the following aspects that arise solely in the case of model development and online implementations:

- selection of process variables that represent the nature of transient operations;
- definition of two-stage transient operation;
- process trajectory synchronization scheme based on synchronization scales defined in such stages of transient operation;
- handling missing data that are generated by the applied process trajectory synchronization scheme;
- method to identify the process variables that are most likely related to the predicted breakout;
- definition of adjustable parameters in the statistical model and method of model online tuning;
- method to determine the process state of various transient operations in order to monitor start-up, run-time and transient operations in an integrated online monitoring system, and the required hardware and software to support such a method;
- method to ensure the change of process state is transparent and seamless to operators, and the associated HMI (Human Machine Interface) screens designated to support such a method.

To summarize, it is the method and real-time application of the MPCA technology particularly applied to continuous caster transient operations for monitoring and predicting transient-cast breakouts, that is both novel and non-obvious.

DESCRIPTION OF DRAWINGS

In order to better understand the invention, a preferred embodiment is described below with reference to the accompanying drawings, in which.

BEST MODE FOR CARRYING OUT THE INVENTION

This invention is a real-time system of monitoring continuous caster transient operations and predicting transient-cast breakouts using MPCA technology and the associated method to develop such a system. The system is implemented by a process computer system that can be applied to a variety of continuous casters, which is not limited by their individual design features, such as type of product (i.e., billet, bloom or slab), type of mold (i.e., tubular mold or plate mold) and so forth. The system can also be applied to a variety of transient operations in a continuous caster, where the transient operations include, but are not limited to, SEN changes, flying tundish changes, product grade changes, etc. Although in the following description of a preferred embodiment of this invention, the transient operation refers to an SEN change as a particular example, one skilled in the art should realize, as other transient operations such as flying tundish changes, product grade changes and so on reveal the similar process dynamics of SEN changes, the real-time system and method disclosed in this invention can also be applied to them and therefore this invention is not limited thereto.

Figure 1A:
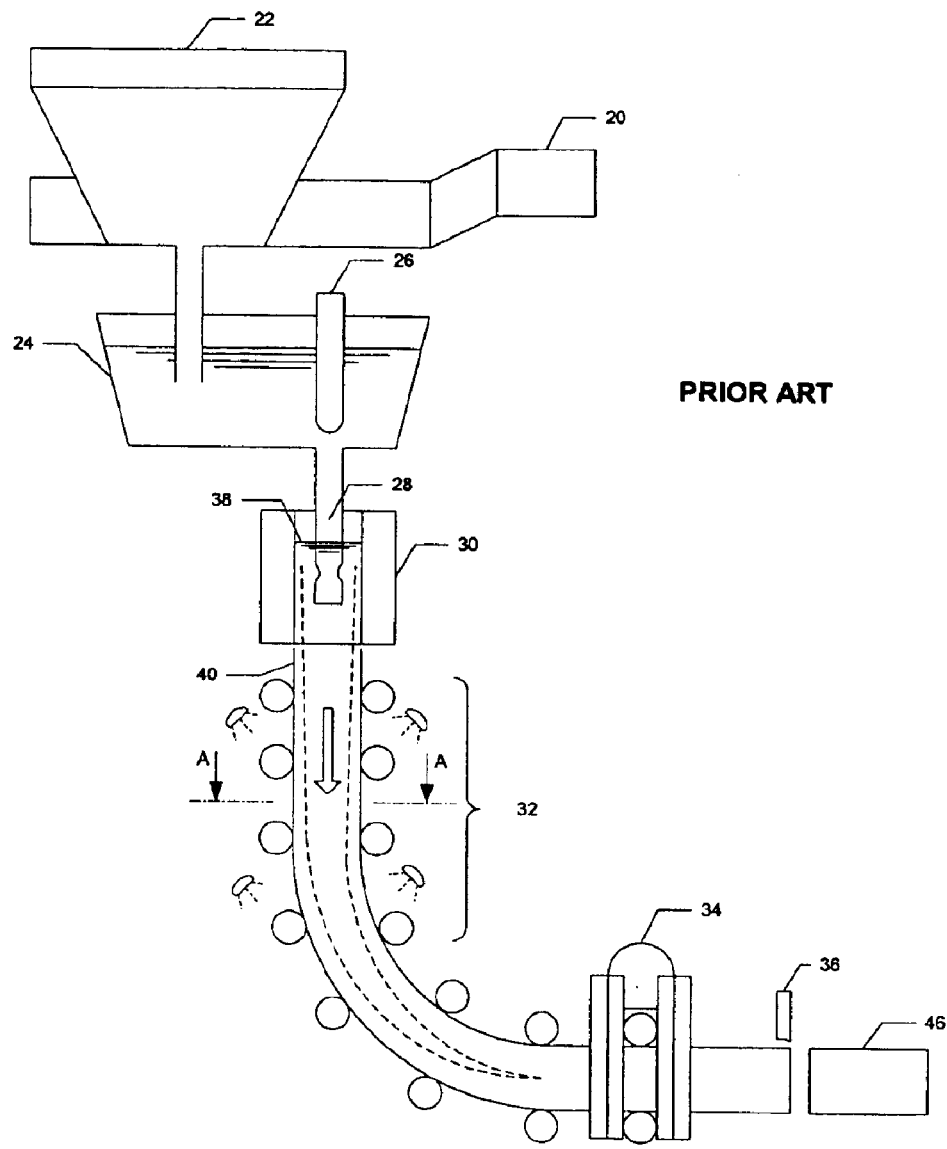
FIG. 1a is a schematic diagram of a continuous caster according to the prior art.
Figure 1B:
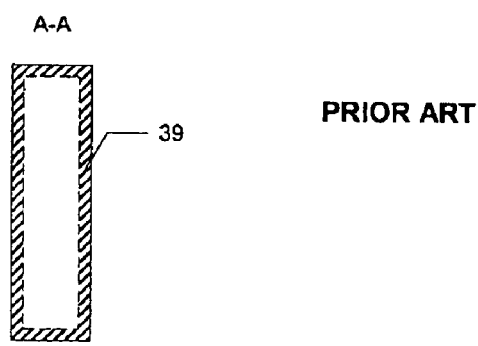
FIG. 1b is a cross-sectional view drawn on line A—A of FIG. 1(a).
Figure 2:
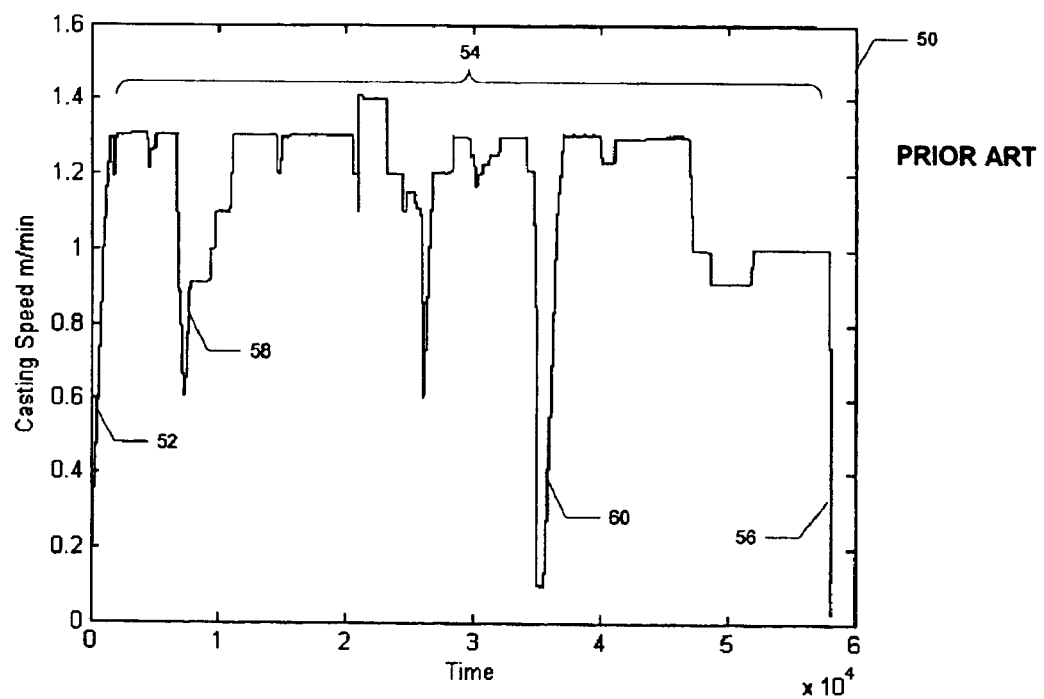
FIG. 2 is a graph to demonstrate a typical casting speed profile for an entire casting sequence consisting of a start-up operation, a shut-down operation and a continuous, run-time production operation along with special transient operations such as an SEN change and a flying tundish change.
Figure 3:
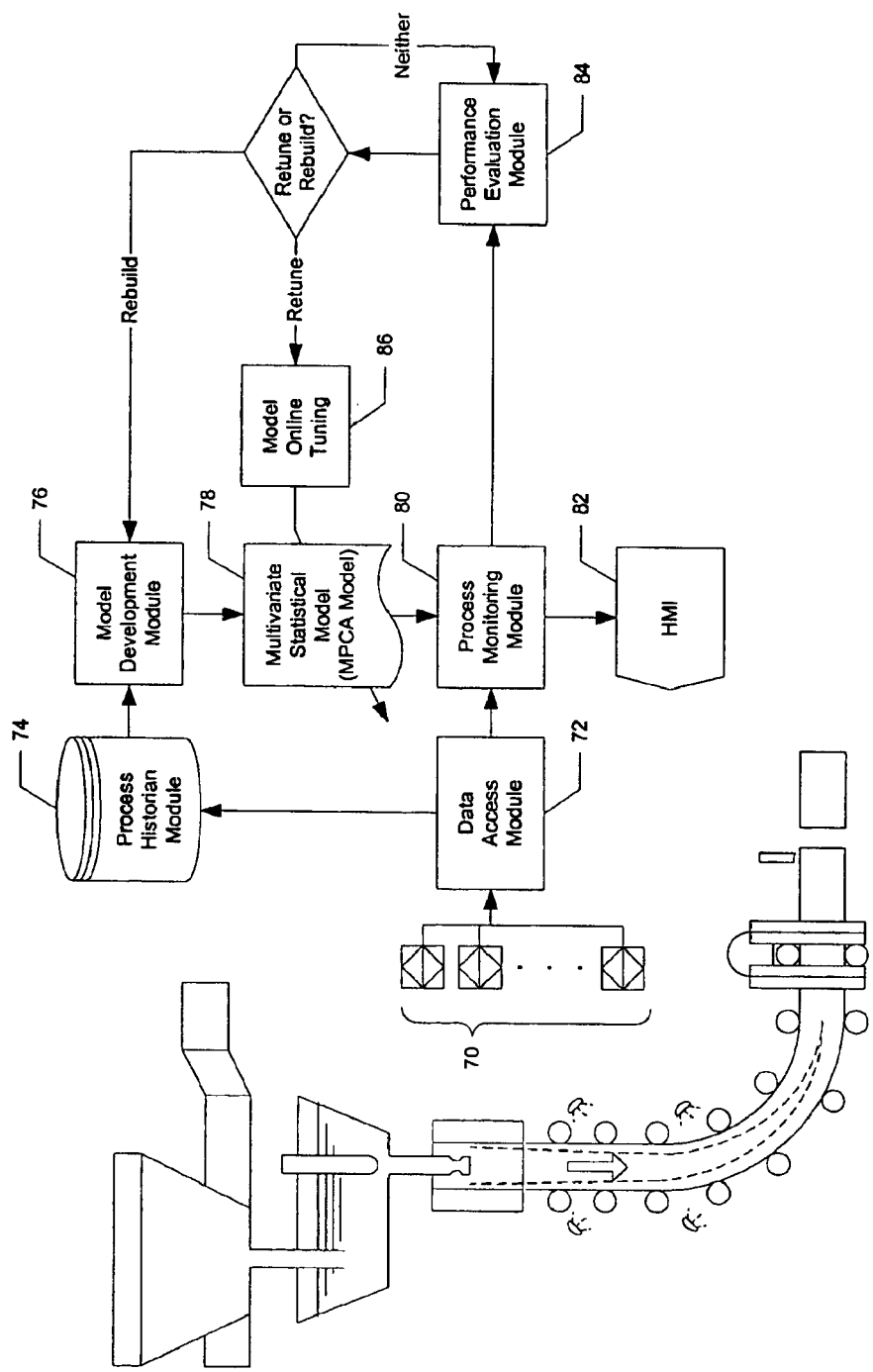
FIG. 3 is a function block diagram of a real-time system applied to monitoring transient operations in a continuous casting process.

As described previously, one example of continuous slab casters is shown in FIG. 1. For such a continuous caster, the function block diagram of a real-time system that is able to monitor the transient operations and predict transient-cast breakouts is depicted in FIG. 3. In addition to the process part, there are many different types of sensors 70 located throughout the entire continuous caster and each sensor obtains a different measurement that represents the current operating condition of the continuous caster. These measurements may include, but are not limited to, tundish weight, mold temperatures, molten steel level in the mold, temperatures and flow rates of inlet and outlet cooling water, and so on. Note that the sensors and obtained process measurements may be different in various process designs of continuous casters, and the invention is not limited thereto. The measurements obtained from these sensors are collected online, in real-time, by a data access module 72, and then sent to an online process monitoring module 80. Once the process monitoring module receives the real-time process measurements, a series of calculations are performed based on a given multivariate statistical model 78 to predict an impending transient-cast breakout or other process abnormalities. A model development module 76 is used to develop the above model offline in which the normal transient operation of a continuous caster is characterized by the model from the selected process data in a process historical data repository 74. The process monitoring module is responsible for sending the real-time process data to the historical database for data archiving purposes. The generated breakout alarms and the identified process variables that are most likely related to the predicted breakout are sent to and displayed in a human-machine interface (HMI) 82. A performance evaluation module 84 is added into the system to monitor alarms of transient-cast breakouts and determine if the model needs to be re-tuned or re-built based on pre-determined model performance criteria such as false alarm rate, failed alarm rate, etc. If required, the multivariate statistical model can be rebuilt offline by 76. The resulting model also provides certain adjustable parameters for online re-tuning to improve the model performance. For example, such adjustable parameters can be tuned online at 86 to partially compensate for possible drifts from a normal SEN change operation region not characterized by the models.

Figure 4:
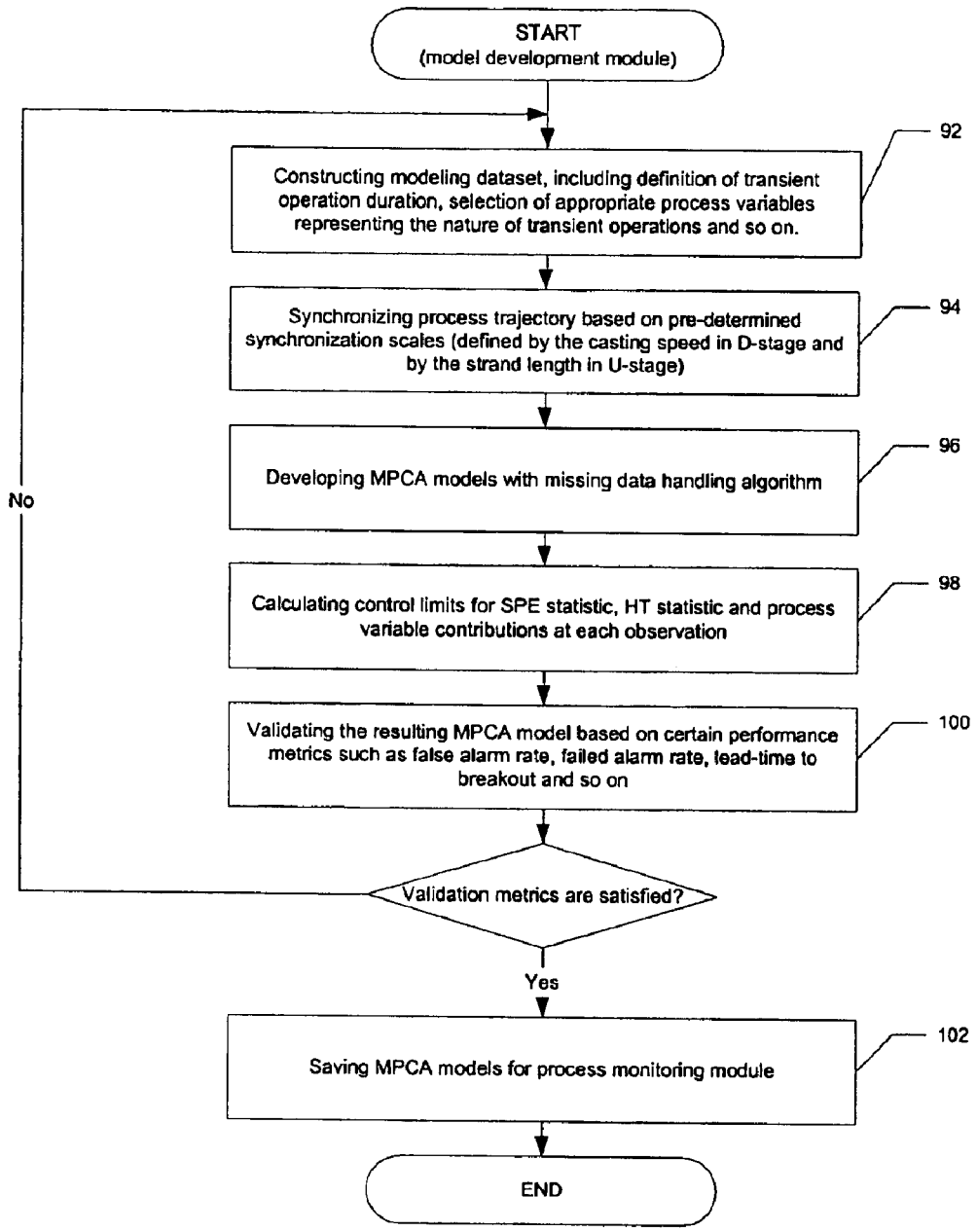
FIG. 4 is a flow chart setting forth the steps in the model development module of this invention to develop an MPCA model from selected historical data in order to characterize normal operation of casting transient operations.

FIG. 4 is a flow chart setting forth the steps in the model development module 76 (FIG. 3) of this invention to build an MPCA model from the selected historical data in order to characterize the normal operation of caster transient operations. Each step is described below in detail with reference to a preferred embodiment, in which the transient operation is particularly refers to an SEN change. There are a number of aspects to the invention that impact on its successful realization, as described below.

Modeling Dataset Construction

In order to build an MPCA model to characterize the normal transient operation of SEN changes, a modeling dataset, containing a large amount of historical operating data that is able to cover most of normal operation regions, is required. The modeling dataset construction procedure at 92 will now be described in detail.

A total of 124 process variables, including actual sensor measurements and calculated engineering variables (including temperature difference, heat transfer and so on) of the continuous caster, are collected from the process historical database, at the sampling interval of 400 ms over about a 12-month period. Note that the time period and the sampling interval specified herein are illustrative of a preferred settings for collecting a sufficient amount of data at a satisfied sampling frequency in comparison with the operation speed of continuous caster, and this invention is therefore not limited thereto. The data retrieval results in a two-dimensional dataset with 124 process variables by 216,000 observations during a 24-hour period of operation, and a fairly large data matrix over the 12-month period. Such a dataset needs to be reduced to render itself suitable for the model development purposes. In one preferred embodiment, the dataset reduction is achieved by choosing the appropriate process variables that are able to represent the nature of caster transient operations and selecting data in a properly defined duration.

Choosing appropriate process variables is a crucial issue to the success of data reduction and future model development. The procedures to choose appropriate process variables follow a number of simple methods such as utilizing process knowledge, condition checking or statistical calculation, etc., which may be utilized individually, or preferably in combination, to choose the process variables having significant impact on SEN changes or transient-cast breakouts.

As previously indicated, a total of 124 process variables are retrieved from the historical database, and they can be categorized into the following groups:

thermocouple readings, including a total of 44 mold temperatures and their differences defined below;

mold information, including mold oscillation frequency, stopper-rod position, SEN immersion depth, mold width, etc.;

tundish information, including tundish car net weight, SEN argon flow, etc.;

cooling water information, including inlet/outlet cooling water flows and temperatures;

heat transfer information, include heat flux transferred through mold faces;

composition information, including the composition of carbon, manganese, silicon, etc. in the molten steel.

In a preferred embodiment, a series of criteria are applied for choosing appropriate process variables: the variables will be chosen if they are known to be crucial to SEN changes or relevant to transient-cast breakouts, or they reveal a dynamic transition during SEN changes; whereas, the variables will not be chosen if, during SEN changes, they show very infrequent changes in comparison with the process dynamics, or they contain more than 20% missing data, or they have very small variance in the deviation from their average trajectory (calculated from available historical data).

Applying the above criteria results in 60 of the 124 process variables being selected in a preferred embodiment. They are:

mold thermocouple readings;

temperature differences between the pre-defined thermocouple pairs (see below);

stopper rod position;

mold cooling water flows;

temperature difference between inlet/outlet mold cooling water;

calculated heat flux transferred through each mold face.

Figure 5:
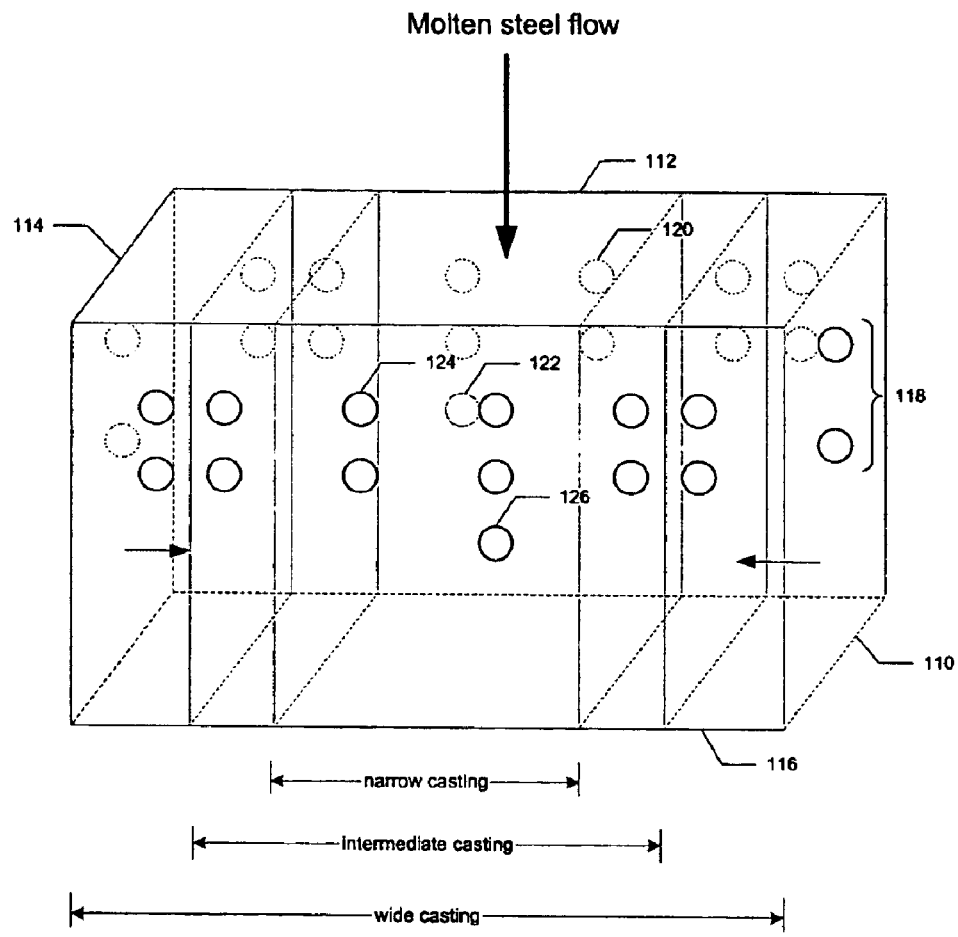
FIG. 5 is a schematic of a continuous caster plate mold used in this invention, providing the location of each thermocouple around the mold and defining thermocouple pairs.

The thermocouple locations around the mold in this invention are shown in FIG. 5. In each of the narrow faces of the mold (i.e., east face 110 and west face 114), there are two thermocouples forming a vertical pair (illustrated by 118), respectively. In each of the broad faces of the mold (i.e., south face 116 and north face 112), there are thirteen thermocouples respectively, where twelve of them form six vertical pairs. Two extra pairs are formed by 124 and 126 in the south face and 120 and 122 in the north face. In a normal transient operation, the temperature difference of each thermocouple pair should be above a certain value to indicate a proper solidification of molten steel. It is worth noting that in the mold shown in FIG. 5, both the narrow faces (110 and 114) can be moved to adjust the mold width. Hence, three operating modes are defined as follows:

wide-casting mode where the width of the casting strand is greater than 1.25 meters.

intermediate-casting mode where the width of the casting strand is greater than 1.0 meter and less than or equal to 1.25 meters.

narrow-casting mode where the width of the casting strand is less than or equal to 1.0 meter.

Due to the change of the mold width, some thermocouples at the outside of the broad faces may no longer represent the temperature of the steel in the mold, when the mold is operated in the intermediate-casting or the narrow-casting mode.

The heat flux transferred through each mold face is calculated as follows:

$$Q = C_p * F_w * \Delta T / A$$

where Q is the calculated heat flux, $C_p$ is the heat capacity of cooling water, $F_w$ is the cooling water flow, $\Delta T$ is the temperature difference between inlet and outlet cooling water and A is the area of the mold face. Choosing the heat flux variables is based on the fact that heat transfer through the mold is responsible for the slab surface quality and the caster productivity. Either excessive heat removal or insufficient heat removal from the solidifying strand could lead to a breakout.

Choosing process variables is an iterative procedure, in which the process variables may be added or removed depending on the performance of developed models. One skilled in the art will realize that if any other process variables become available which satisfy the above criteria, they will be included in order to improve the model quality and further improve the performance of the transient-cast breakout prediction. As a result, the invention is not limited thereto.

In order to monitor an SEN change and predict an impending transient-cast breakout using MPCA technology, the duration of the SEN change must be distinctly defined. An SEN change is usually executed every 3 or 4 hours during continuous casting production. Referring to the casting speed profile 132 of an SEN change shown in FIG. 6, it typically consists of three operational steps:

Point A to B: slowing down the caster from the steady-state casting speed in continuous operation (at Point A) to approximately 0.6 meters/minute;

Point B to C: manually replacing the used SEN with a new one while the casting speed remains unchanged (the casting speed between B and C is referred to as holding speed);

Point C to E: ramping up the casting speed back to the desired normal operating condition (at Point E).

For the given large historical dataset, Points A, B, C, and E of each SEN change can be approximately identified in the following sequence:

Step.1: Point B is determined by the first point in the historical operating data where the casting speed at this point is less than 0.65 meters/minute and greater than 0.55 meters/minute, and at the same time the mold level control is in manual mode;

Step.2: Point A is determined in such a way that A is the last point before the Point B, where the average casting speed in a 5-minute duration just prior to the Point A is greater than 0.7 meters/minute, and the standard deviation of the casting speed in the 5-minute duration is less than 5e−3;

Step.3: Point C is determined by the first point after the Point B and the gradient of the casting speed is greater than $1.5 \times 10^{-3}$ meters/minute$^2$;

Step.4: Point E is determined in such a way that E is the first point after C, where the average casting speed in a 5-minute duration right after the Point C is greater than 0.7 meters/minute, and the standard deviation of the casting speed in the 5-minute duration is less than 5e−3;

Step.5: Save all operating data of the chosen process variables between Point A and E and eliminate them from the large historical dataset. Go to Step.1 for the next SEN change until Point B is no longer found in the historical dataset.

Figure 7A:
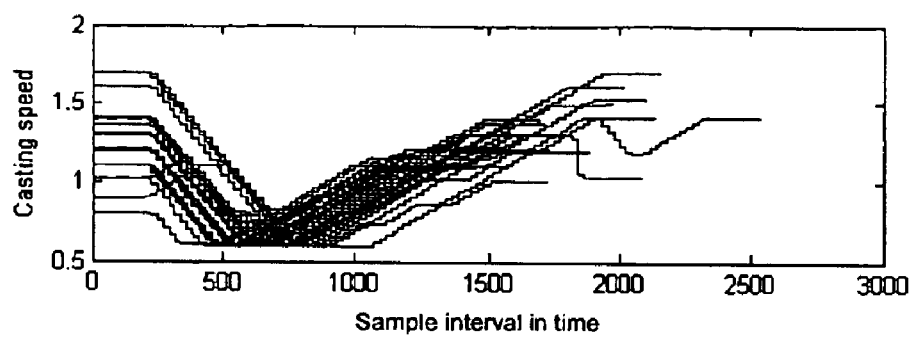
FIG. 7a is a graph to illustrate various process dynamics of SEN changes showing changes in casting speed.
Figure 7B:
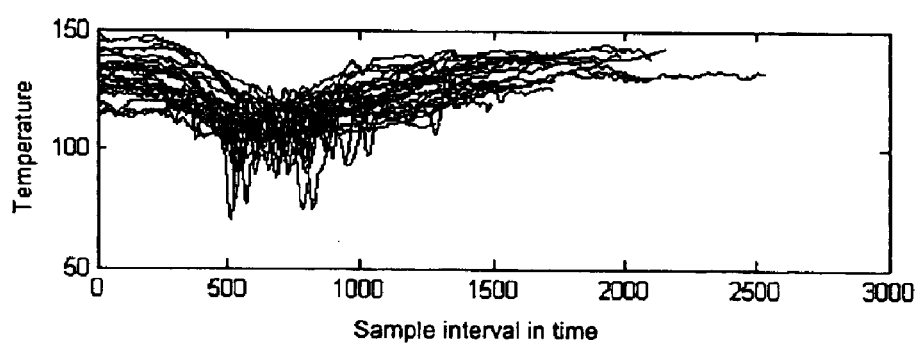
FIG. 7b is a graph to illustrate various process dynamics of SEN changes showing changes in an upper thermocouple temperature.

In practice, a number of variations exist in SEN changes due to different steel grades and changing operating conditions. For example, as shown by FIG. 7(*a*), the steady-state speed at Point A can vary from 0.8 to 1.7 meters/minute; the time duration from Point B to C can vary depending on how long it takes for operators to manually change an SEN; and the acceleration of casting speed between Point C to E can also vary, for example, the casting speed may increase, remain constant, or even decrease at any time in this duration. The above variations lead to various process dynamics shown in each SEN change. Examples of process trajectories of one upper thermocouple temperature of the mold is illustrated by FIG. 7(*b*).

Figure 6:
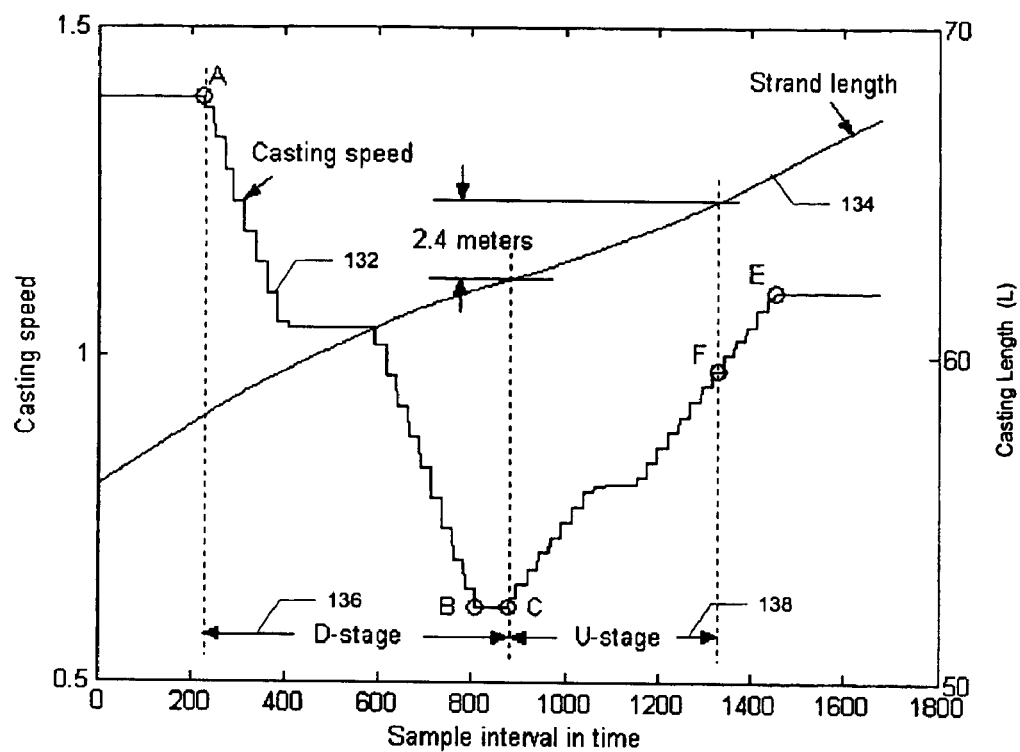
FIG. 6 is a graph to illustrate casting speed and strand length profile of a typical transient operation (e.g. SEN change) which are used to segment a transient operation into two stages.

Instead of defining the SEN change duration by Point A and E, in this invention, it is defined as follows for the purpose of process trajectory synchronization, which will be described below:

Refer to FIG. 6, the SEN change duration begins with the Point A; a strand length variable 134, denoted by L, is set to equal zero at the start time when the caster initially starts and the strand length at any time during the casting sequence can be calculated by the integral of the casting speed over the time between the start time and the said time. Thus, SEN change duration ends by the Point F, where F is determined in such a way that L(F)−L(C)=2.4 meters. The value of 2.4 meters is initially selected based on prior process knowledge and then verified by the steady-state detection to ensure that most caster operations reach a steady state at the end of the SEN change. One skilled in the art will realize that this value may vary depending on the different casting processes and still produce acceptable results and, therefore, this invention is not limited thereto.

Once the SEN change duration is defined, only the data in the identified duration (between Point A and F) are selected from the historical dataset to construct the modeling dataset.

Figure 8:
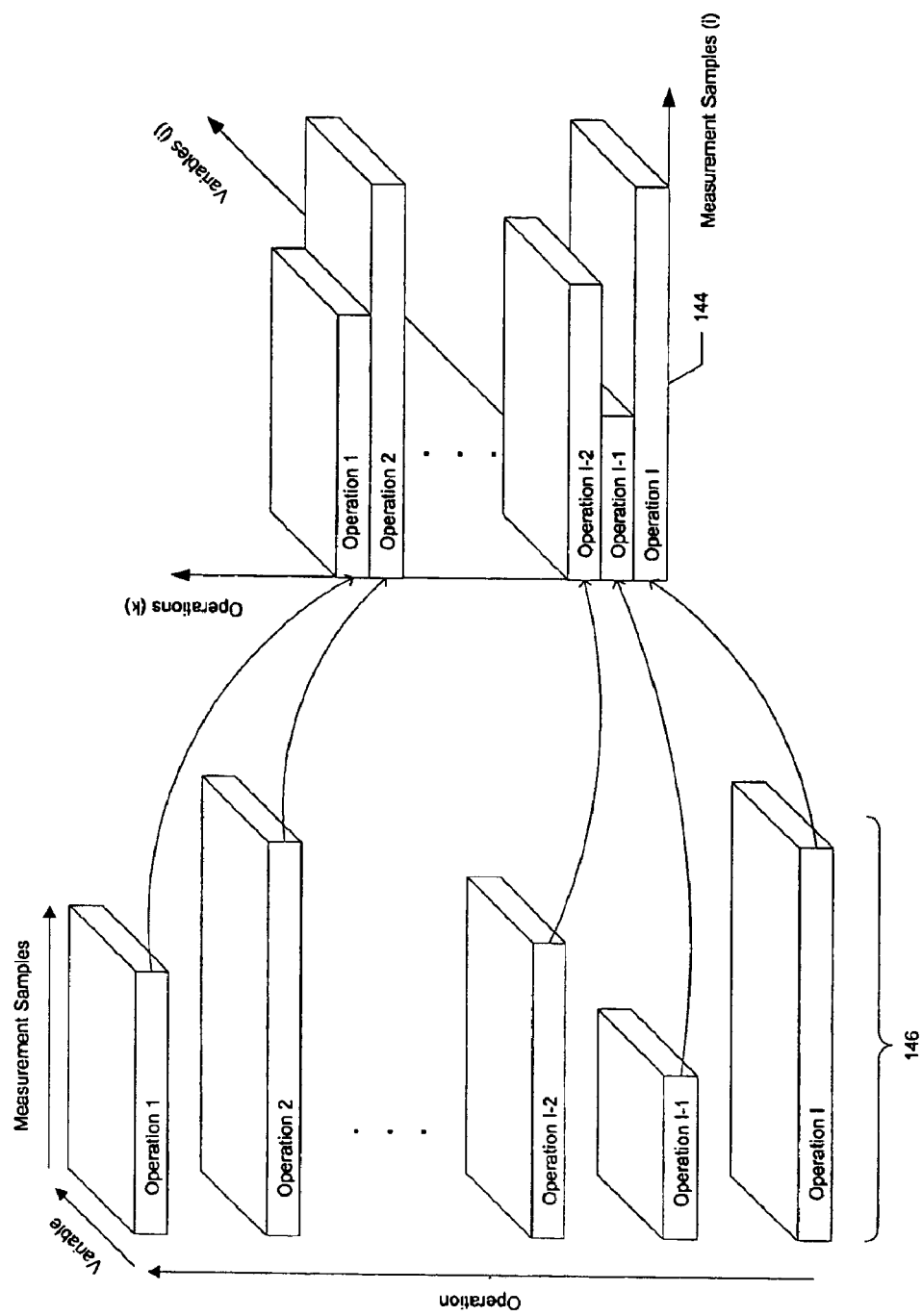
FIG. 8 is a graph to illustrate the SEN change operating data in three dimensions.

After reducing the large dataset retrieved from the historical database by selecting the data of appropriate process variables in the defined SEN change duration, the reduced dataset is re-organized as a three-dimensional data block 144, as demonstrated in FIG. 8, where each SEN change operation 146 is described as a two-dimensional data matrix with selected variables by a number of measurement samples in the SEN change duration. More specifically, the element (i,j,k) of the data block 144 refers to the value of variable j at sample i in No. k SEN change operation. Note that, in this data block, each SEN change operation has the identical sampling interval of 400 ms, however, they may have a different number of measurement samples since the SEN change duration may vary from one operation to another as previously described.

The SEN change operations in the data block 144 can be categorized into 2 groups, group A and group B, by applying the following criteria:

an SEN change operation belongs to group A if a transient-cast breakout occurs in this operation;

an SEN change operation belongs to group B if no transient-breakout occurs in this operation and the following conditions are satisfied: there are no missing data in the casting speed; the casting speed decreases monotonically between Point A and B; the width of casting strand does not change during the SEN change; and the average casting acceleration between Point C and F is within a certain predetermined range;

if the SEN change operation does not satisfy the above conditions, it is discarded.

As a result, the modeling dataset is constructed at 92 in FIG. 4 by, in one preferred embodiment, arbitrarily selecting 80% of the SEN changes in group B. The remaining 20% of the SEN changes in group B along with all SEN changes in group A form a validation dataset. The modeling set is used to develop MPCA models to predict the transient-cast breakouts during SEN changes; and the validation dataset is used to validate the prediction performance of the developed models when presented with a new SEN change operation.

The modeling dataset should span most of normal operating region, and it is desirable that in one preferred embodiment, the modeling dataset contains at least 500 SEN change operations.

Note that the above settings for constructing modeling and validation datasets may change in different embodiments and the invention is not limited thereto.

Process Trajectory Synchronization

The invention builds a statistical model for the deviation of each chosen process variable from its average trajectory using the historical data of normal SEN changes. Then it compares the deviation from the average trajectory of the same process variables in a new SEN change with the historical benchmark characterized by the model; any difference that cannot be statistically attributed to common process variations indicates that the new operation is different from a normal operation. Such a comparison in this invention requires all trajectories in different SEN change operations to have equal duration and to be synchronized with the progress of SEN change operations.

As previously indicated, in either a modeling dataset or a validation dataset, each SEN change has different numbers of measurement samples due to the varied SEN change duration. Such data are not suitable for building an MPCA model, and have to be synchronized.

In a preferred embodiment of the invention, a process trajectory synchronization procedure at 94 in FIG. 4 is developed based on a unique two-stage synchronization scheme. Referring to FIG. 6, an entire SEN change operation is divided into two stages. The first stage 136, denoted by D-stage, starts from Point A and ends at Point C, in which the casting speed is continuously decreasing in a step fashion, and therefore can be used to represent the progress of this stage. The second stage 138, denoted by U-stage, is from Point C to F, where the pre-defined casting strand length L increases monotonically and is used to characterize the evolution of U-stage. Thus, the process trajectories of an SEN change can be synchronized in the defined two stages based on the casting speed 132 and the casting strand length 134, respectively, as described in detail below.

Three steps are followed in this invention to synchronize the process trajectories in D-stage:

Step.1: the maximum and minimum casting speed within D-stage are determined based on the prior process knowledge or the large historical dataset. They are denoted by $V_{max}$ and $V_{min}$, respectively. In a preferred embodiment of this invention, $V_{max}=1.7$ meters/minute and $V_{min}=0.55$ meters/minute.

Step.2: the synchronization scale for D-stage is defined by:

$$r(i)=V_{max}-i*(V_{max}-V_{min})/(M-1), i=0, \ldots M$$

where i is the index of r and M is the number of scales within the D-stage. A guideline for determining the value of M is given by:

$$M=\min\{n|(V_{max}-V_{min})/n<dV, n>0\}$$

where dV is the minimum step change of the casting speed during the D-stage.

Step.3: all process trajectories in D-stage are synchronized by interpolating them based on the synchronization scale defined on the casting speed. The synchronized values at each synchronization scale are referred to as an observation.

Similarly, four steps are followed to synchronize the process trajectories in U-stage:

Step.1: a nominal casting speed profile in U-stage is obtained from its historical data. A linear function is used to approximately describe the increasing casting speed profile, denoted by $v_0$, with respect to time t:

$$v_0(t)=a*t+b$$

where, in a preferred embodiment, t=0 at Point C, the parameter a is equal to $4.15 \times 10^{-5}$ and b is equal to $1.7 \times 10^{-3}$.

Step.2: the nominal strand length in U-stage, denoted by $L_0$ can be obtained by calculating the integral of the nominal casting speed:

$$L_0(t)=0.5*a*t^2+b*t$$

Step.3: the nominal strand length is re-sampled by the non-uniform synchronization scales, which is denoted by s and determined by:

$$s(i)=0.5*a*(i*T/N)^2+b*(i*T/N), i=0, \ldots N$$

where i is the index of s; T is the nominal value of SEN change duration, that is calculated by $L_0(T)=2.4$ meters; and N is the number of scales in the strand length. The non-uniform synchronization scales in U-stage is illustrated by 148 in FIG. 9. A guideline for determining the value of N is given by:

$$N=\min\{n|T/n<t_s, n>0\}$$

where $t_s$ is the sampling interval that is equal to 400 ms in a preferred embodiment of this invention.

Figure 9:
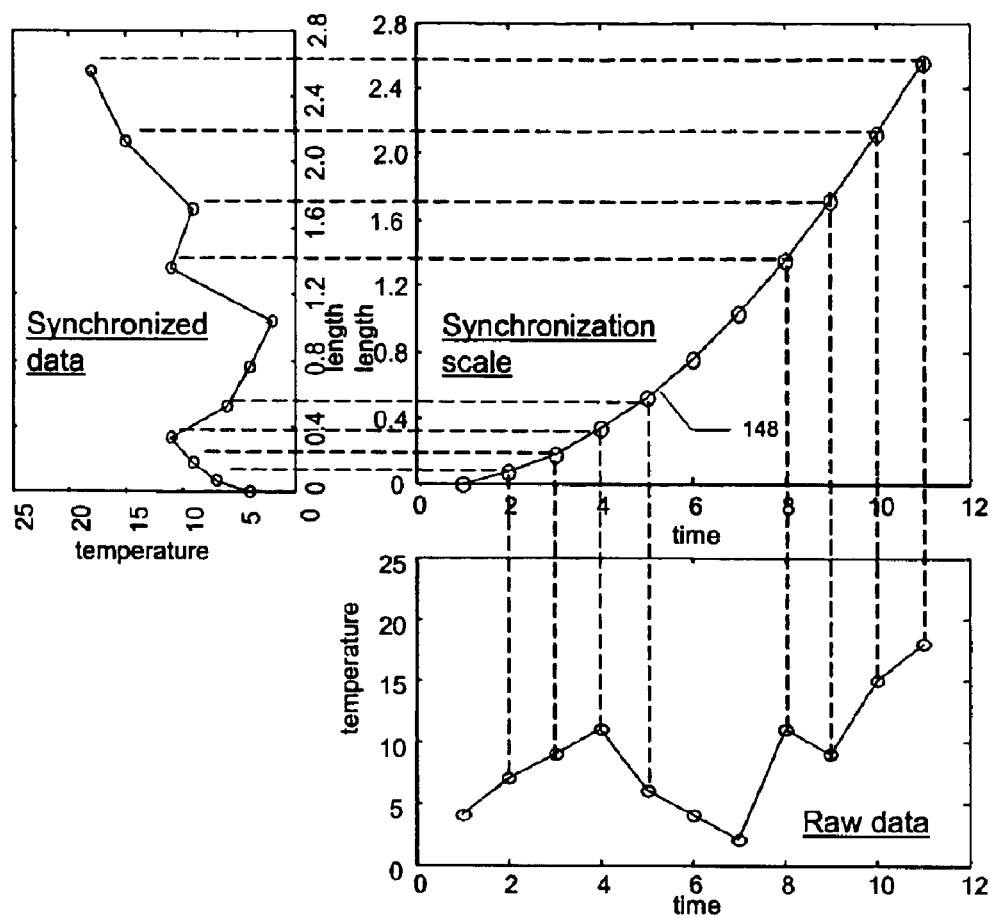
FIG. 9 is a graph to illustrate the non-uniform synchronization scaled defined on the strand length for synchronizing process trajectories in the SEN change U-stage.

Step.4: once the synchronization scales in the strand length have been determined, the trajectory synchronization is performed by interpolating the trajectories of other selected process variables based on the scales in the strand length, which illustrated by FIG. 9.

Thus, in a synchronized process trajectory, each observation corresponds to a synchronization scale of the casting speed in D-stage or a synchronization scale of the strand length in U-stage. Examples of synchronized process trajectories 150 of one upper thermocouple temperature of the mold is given in FIG. 10.

Some special considerations need to be given to the following issues during the process trajectory synchronization.

Firstly, during the D-stage, the casting speed is decreased in a step fashion, which implies multiple process measurement samples may correspond to one casting speed. When the interpolation is performed for synchronizing process trajectories, in the proposed scheme of this invention, the process measurement for this casting speed is determined by the average of the multiple measurement samples.

Figure 10:
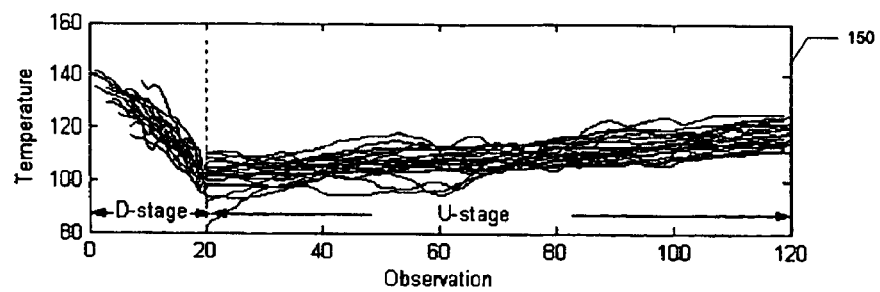
FIG. 10 is a graph to show an example of synchronized process trajectories in the SEN change duration.

Secondly, a practical SEN change may have different steady-state and holding speeds that are equal to some value between $V_{max}$ and $V_{min}$. Thus, some missing data will exist in the synchronized process trajectories in the D-stage due to the applied synchronization scheme, as illustrated in FIG. 10. These missing data are inevitable and will be handled subsequently in the following model development and online monitoring procedures.

In addition, instead of non-uniform synchronization scales in the strand length, uniform scales can also be applied to the strand length for the trajectory synchronization purposes in the U-stage. That implies the strand length is re-sampled evenly by N samples. However, this method causes the MPCA calculation to be performed less frequently at the beginning of the U-stage than at the end of that, since the casting speed is almost always increasing during the course of the U-stage. As we know, the beginning of the U-stage normally shows more process disturbances. Therefore, a uniform scale method may result in losing opportunities to detect transient-cast breakouts at an early time.

Figure 11:
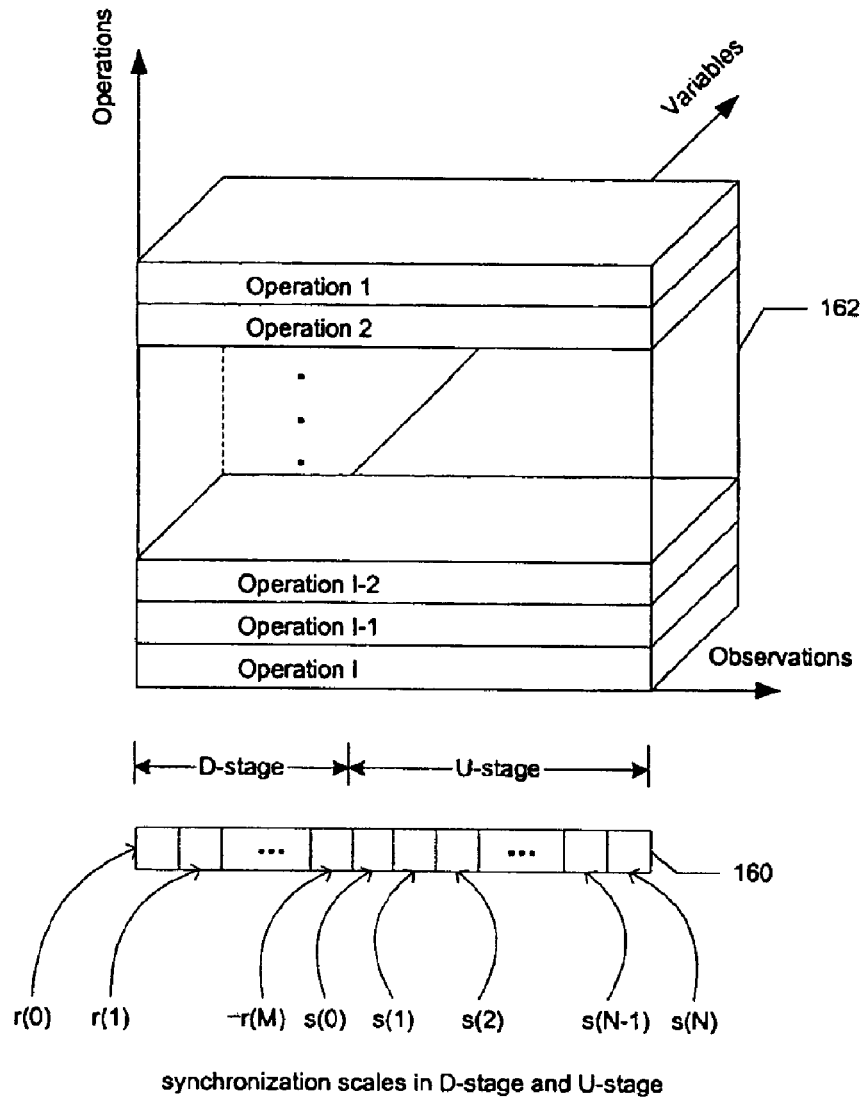
FIG. 11 is a graph to illustrate the synchronized three-dimensional SEN change data aligned with respect to the synchronization scales in D-stage and U-stage, respectively.

As a result of performing trajectory synchronization, a new three-dimensional data block 162 is obtained as shown in FIG. 11, where all process trajectories in different stages of SEN changes are aligned with respect to the given synchronization scales 160 defined by either the casting speed or the casting strand length.

At this stage, the average values and standard deviations are calculated for each column of data block 162 and they will be used for the further data pre-processing, including mean-centering and auto-scaling.

MPCA Model Development with Missing Data

An MPCA model is developed at 96 (FIG. 4) based on the synchronized data in the modeling dataset. The data in the synchronized three-dimensional data block 162 are mean-centred and auto-scaled to zero mean and unit variance in the column-wise. Mean-centering is used to subtract the average trajectory of each process variable such that the data will only represent the deviation from the average trajectory and, hence, the process nonlinearity is, at least partially, removed. Auto-scaling is used to obtain a zero-mean, unit variance distribution for each variable at each observation in order to assign the same priority weight to the variable.

Figure 12:
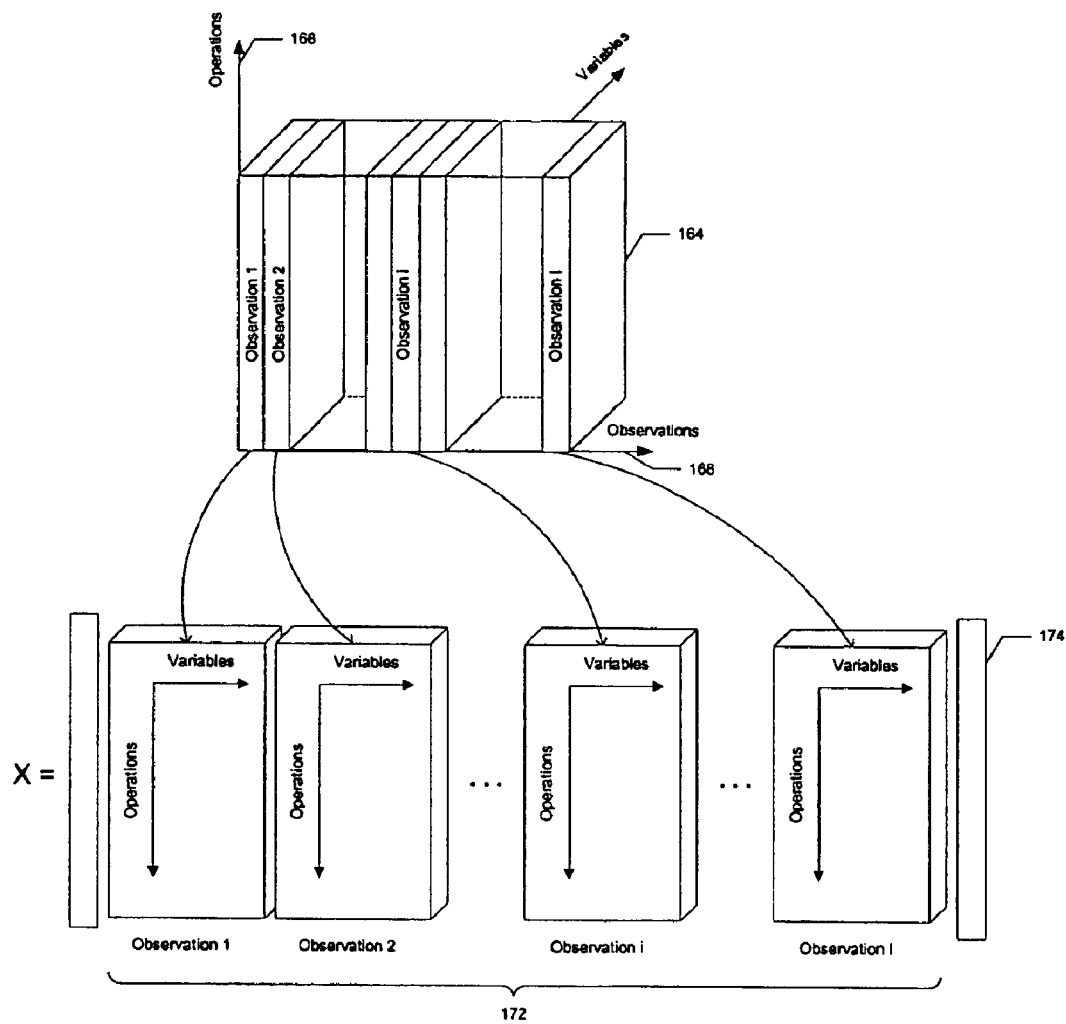
FIG. 12 is a graph to illustrate the three-dimensional synchronized SEN change data block being unfolded to a two-dimensional data matrix to preserve the direction of SEN change operations.
Figure 13:
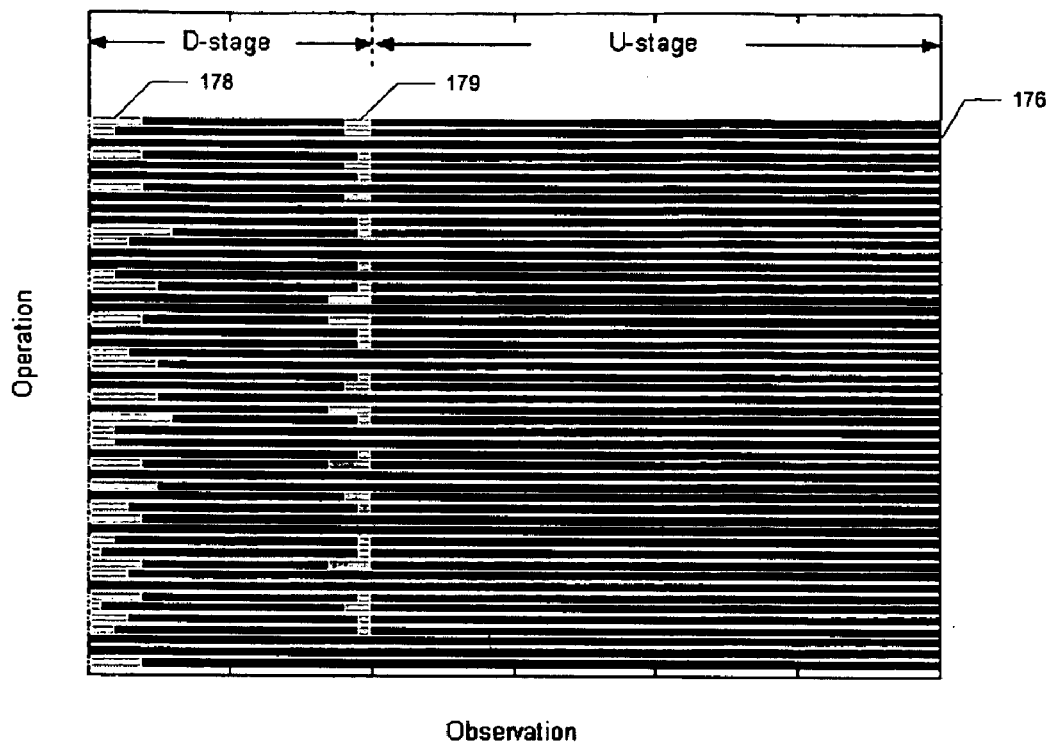
FIG. 13 is a graph to illustrate the missing data pattern in the 2-dimensional unfolded data matrix, which is generated by the applied process trajectory synchronization scheme in D-stage.

Referring to FIG. 12, the core concept of the MPCA technology is to unfold the resulting mean-centred and auto-scaled three-dimensional data block 164 to preserve the direction of operations 166. The data block 164 is sliced vertically along the observation direction 168; the obtained slices 172 are juxtaposed in order to build a two-dimensional data matrix X 174 with a large column dimension such that each row corresponds to an SEN change operation. A standard PCA algorithm is then applied to this unfolded data matrix X: the data in this matrix are projected to a new latent variable space defined by a loading matrix P, where most of the process variance contained in the original data is captured by only a few latent variables, also known as principal components. The values of principal components for each SEN change operation are called scores, denoted by T. It is worth noting that, due to the applied process trajectory synchronization scheme in D-stage, the Matrix X contains some missing data. The pattern of missing data in the Matrix X is illustrated by 176 in FIG. 13, where the missing data are shown at the beginning (178) or the end (179) of SEN change D-stage. In order to handle such missing data, H. Wold's NIPALS algorithm (described by Geladi et al in Analtica Chemica Acta, Volume 185, 1986) is adopted, in which, linear regressions between the columns (or rows) of data matrix X and the score (or loading) vectors are performed iteratively to obtain the converged scores T and loading matrix P. Particularly in this invention, when data in any column or row of the data matrix X are missing, they are handled in such a way that the linear regressions are performed simply by ignoring the missing points. Thus, the effect of missing data generated from the process trajectory synchronization procedure is eliminated from the MPCA model development.

Two statistics, Squared Prediction Error (SPE) and "Hotelling T" (HT), are defined at each observation based on the loading matrix P and the scores T, such that they are able to describe how each operation in the modeling set is coincided with the normal operation as the operation evolves with the decreasing casting speed in the D-stage and the increasing strand length in U-stage. The detailed definition of SPE and HT are described by Nomikos et al in Technometrics, Volume 37, 1995. Similar to the philosophy of univariate statistical process control, the control limits for both SPE and HT are required to be determined at 98 (FIG. 4) in order to monitor a new SEN change. Theoretically, these two statistics follow known probability distributions under the assumption that all process variables and the resulting scores T are multinormally distributed. Such an assumption, however, is not applied to the SEN change operation. In a preferred embodiment of this invention, the control limits for both SPE and HT are determined by the historical data in the modeling set as follows. Take SPE as an example, at observation k, SPE values for all normal SEN change operations in the modeling dataset are calculated and the histograms of the resulting SPE values are plotted. A constant $C_{SPE,k}$ is determined such that only a certain percentage (e.g., 5% in a preferred embodiment of this invention) of SEN change operations in the modeling dataset has a SPE value beyond $C_{SPE,k}$. Thus, the SPE control limit at the observation k is given by:

$$CL_{SPE,k} = g * C_{SPE,k}$$

where g is a tuning parameter to compensate for any errors due to the limited size of the modeling dataset. The value of g is normally greater than 1 and less than 1.75. The same method is applied to determine the control limits on HT. It is worth nothing that, the assumption behind this alternative method is that a large number of historical data of SEN change operations are available to build the modeling dataset and these operations are able to cover the majority of operating regions.

Furthermore, the contribution of each variable to SPE or HT, at each observation, is also calculated based on the definition of SPE and HT. The same method described above is applied to determine the control limits for these contributions.

A number of models may need to be developed to cover the entire range of caster operating conditions. This depends greatly on the process itself and if there are a number of distinct conditions of operation, each of which may require a separate model. Typical factors that may influence the number of models required for SEN change monitoring include, but are not limited to, the steel grade, the width of casting strand and so on. In one preferred embodiment of this invention, however, only one MPCA model is developed to cover the three operating conditions: wide-casting, intermediate-casting and narrow-casting, as previously described.

When the caster is operated in the intermediate-cast or narrow-casting mode, some thermocouple pairs may no longer represent the temperature of the molten steel in the mold due to the mold width change. If this is the case, all variables related to these thermocouples are considered missing and are handled accordingly.

One skilled in the art will realize that three different models could be built for each of above distinct operating conditions in order to improve the model performance, and therefore the invention is not limited thereto.

Model Validation and Improvement

The last step in the method before putting the resulting MPCA models into an online monitoring system is to validate the model using the SEN change data in the validation dataset defined at 100 (FIG. 4).

As described previously, the validation dataset includes both normal SEN change operations and abnormal operations with the transient-cast breakouts. Three benchmarks are used in one preferred embodiment to validate the resulting model:

- false alarm rate, also known as the Type I Error in statistics;
- failed alarm rate, also known as the Type II Error in statistics;
- lead-time to breakout, which refers to the time interval between the first alarm to an actual breakout.

The initial values are set to 10% for the false alarm rate, 5% for the failed alarm rate, and 10 seconds for the lead-time to breakout. Once the model successfully passes these validation benchmarks, it is ready for online implementation.

One skilled in the art may realize that the aforementioned benchmarks must be balanced in order to obtain a practical MPCA model in terms of both model performance and robustness. That is, the model should show good predictability of transient-cast breakouts and at the same time, be fairly robust to common process disturbances.

Some methods may be utilized to rebuild the model for satisfying the pre-determined validation benchmarks prior to online implementation. These methods include, but are not limited to:

increasing the size of the modeling set by getting more normal SEN change operations;

refining the selected process variable list to avoid any crucial process variable being missed;

increasing the number of principal components to capture more process variance, or decreasing it to result in a more robust model;

retuning the control limits for SPE and HT statistics;

classifying caster SEN change operations by conditions (such as grades of products, etc.) and developing models for each distinct operating condition.

These methods can be applied individually, or preferably in combination to develop a practical model satisfying the actual requirements of the SEN change operation monitoring.

After successful completion of the above procedures in the model development module at 76 in FIG. 3, an MPCA model 78 is saved at 102 in FIG. 4 and is ready for online implementation. The model is loaded into the online process monitoring module 80 (FIG. 3) in order to monitor a new SEN change operation online, in real-time, and predict an impending transient-cast breakout. The process monitoring module contains intensive steps on how to utilize the MPCA model to achieve the desired results, which are described as follows.

Figure 14:
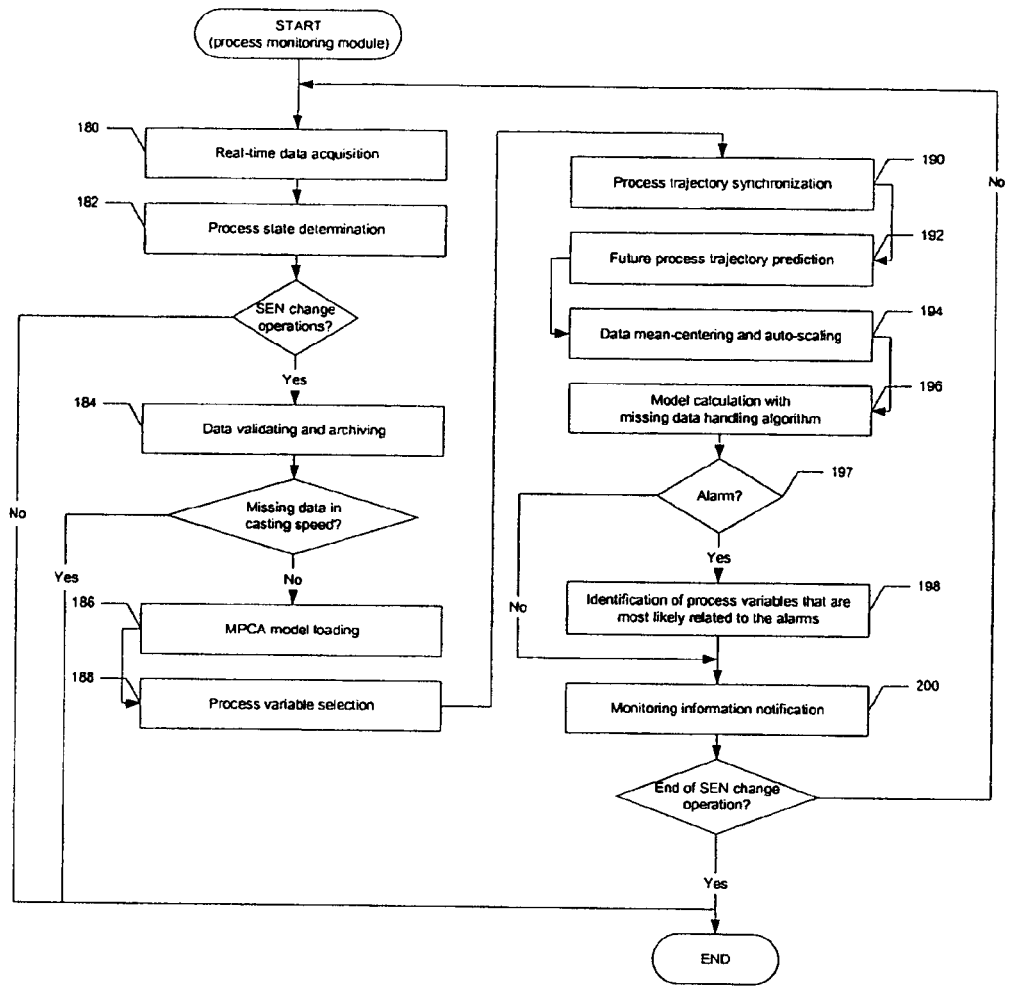
FIG. 14 is a flow chart setting forth the steps of a process monitoring module used in this invention to monitor a new SEN change operation, predict an impending transient-cast breakout and identify the process variables that are most likely related to the predicted breakout.

Referring to FIG. 14, in one preferred embodiment, all sensor measurements of a casting process are collected online at 180 at a pre-determined sampling interval, 400 ms. The real-time measurements are continuously sampled and input to the process monitoring module, where a temporary data buffer is designed to store these data as required. Based on the real-time measurements, a process state determination function in the online process monitoring module is utilized to determine the current process state at 182. If, and only if, the process is in the state of SEN change (including both D-stage and U-stage), then the following calculations are performed.

When a new SEN change evolves, the acquired measurements are first validated with their respective acceptable ranges, and any invalid readings are flagged as "missing" at 184. If missing data are detected in the casting speed, then the calculation will stop because they are considered a critical variable to successful monitoring an SEN change; otherwise, the MPCA model is loaded to the process monitoring module at 186, the process variables required by the model are then chosen at 188. Their process trajectories, from the beginning of the SEN change to the current time, are known from the above data buffer; and they are synchronized at 190 based on the pre-defined synchronization scales determined at 94 (FIG. 4), and aligned with respect to the casting speed in the SEN change D-stage and the strand length in the U-stage. The rest of the trajectories in the future observations are not available and therefore estimated at 192 on the assumption that the current deviation from the average trajectory remains constant over the rest of the SEN change duration. One skilled in the art will realize that the above assumption may change to reflect the actual process operation, for example, in some cases, the trajectories in the future observations can be directly predicted by the average trajectories themselves and it may still produce the acceptable results. The resulting estimated and synchronized trajectories of selected process variables have the same number of observations as defined by the synchronization scales in the SEN change duration and form a two-dimensional data matrix $X_{new}$, where the element $X_{new}$ (j,k) represents the synchronized value of variable j at the observation k.

The $X_{new}$ is pre-processed at 194 to center each variable at each observation around zero and scale to unit variance based on the average values and standard deviations derived from the historical data. Next, the process monitoring module unfolds the pre-processed data matrix following the same method described at 96 (FIG. 4), and then, at 196, computes the scores and SPE and HT statistics, using the loading matrix P in the MPCA model. These statistics provide information on how the present SEN change operation is statistically different from the model, or more specifically, the normal SEN change characterized by the model and, hence, infers the condition of the caster.

At 197, if either SPE or HT statistic of a new SEN change operation exceeds its control limit over 3 consecutive sampling intervals, then an alarm is generated to indicate an impending transient-cast breakout or an abnormal situation. An HT alarm implies the present SEN change is deviating from the normal operation region and a potential transient-cast breakout may occur. Whereas, an SPE alarm indicates the inherent correlation within the selected process variables has been broken and a transient-cast breakout is highly likely. These two types of alarms may be generated individually, or in most cases, they are generated together. In the event of SPE and/or HT alarms, a certain number of process variables that are most likely related to the predicted breakout are identified based on their contributions to the SPE and/or HT statistic, at 198. Both alarms and identified process variables are sent, at 200, to the HMI screens to notify operators such that they are able to take advantage of the provided information to perform further diagnosis or make a corrective decision to avoid the actual occurrence of the predicted breakout.

Figure 15:
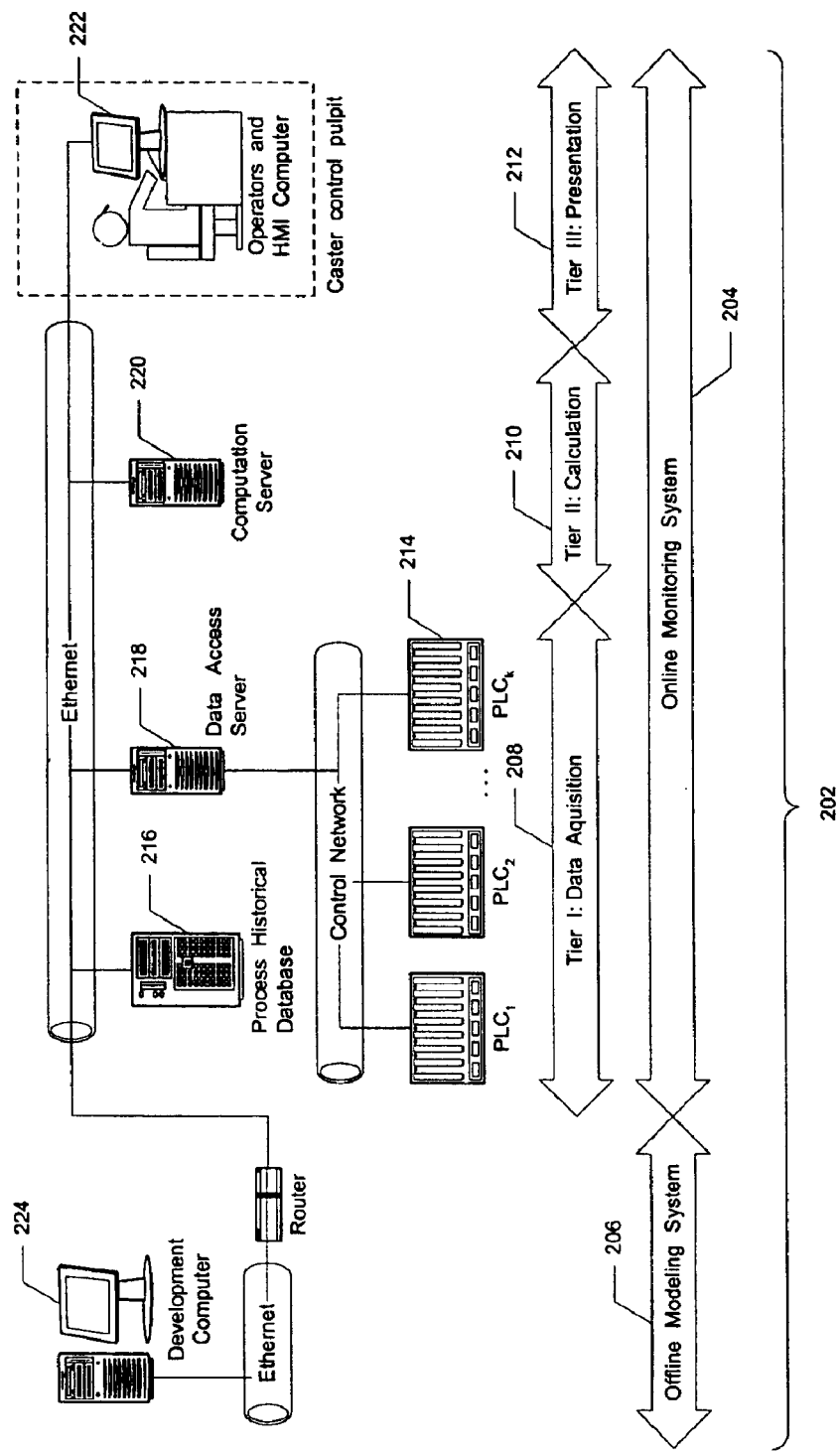
FIG. 15 is a schematic of computer network system architecture for implementing the SEN change monitoring system to predict transient-cast breakouts.

A computer system 202 is designed for an industrial implementation of a caster transient operation monitoring system. The system architecture is shown in FIG. 15, which consists of two components: online monitoring system 204 and offline modeling system 206. The online monitoring system is designed following the standard three-tier software development framework:

Data Tier 208, where a data access server 218 is connected to all programmable logic controllers (PLC) 214 to acquire all real-time process data. In a preferred embodiment of this invention, OPC data access specification is adopted. The selected real-time data are supplied to the second tier for model calculation 210, and at the same time to a process historical database 216 for data archiving purposes. The archived data will be used by the offline modeling system, when the MPCA models are required to be re-built.

Calculation Tier 210, where a computation server 220 is able to receive the real-time data via the data access interface, perform the MPCA calculation, and send the alarm-related information to an HMI computer 222.

Presentation Tier 212, where a HMI computer 222, located in the caster control pulpit, is able to display the current SEN change operating conditions, alarm an impending transient-cast breakout or other process abnormalities in SEN charge based on the provided SPE and HT statistics, and support operators to make a correct decision when an alarm is generated. In one preferred embodiment of this invention, OSI PI process book is a trademark owned by OSI soft, Inc. and is selected to serve as the user interface.

The offline modeling system 206 includes one or several development computers 224 which connect to the production network through a router to maintain network security. The development computers are able to access process historical data easily that mainly used for MPCA model development, model performance evaluation and other ad-hoc analysis. These analyses are very important to keep the system running with a high uptime.

One skilled in the art will realize that the aforementioned computer system may vary in different circumstances, for example, a customized data acquisition system may be used to replace the data access server, or the display function in HMI machine may be integrated into other control system such as a Distributed Control System (DCS), etc. Therefore, this invention is not limited thereto.

There are a number of features in the online system that are novel and non-obvious in the realization of such a system. These features are described in more detail in the text below.

Prerequisites of Online Monitoring SEN Change

There exist two prerequisites in order to monitor an SEN change online using the above procedures. These prerequisites and the solutions to meet them in a preferred embodiment are described in detail in the following context.

Figure 16:
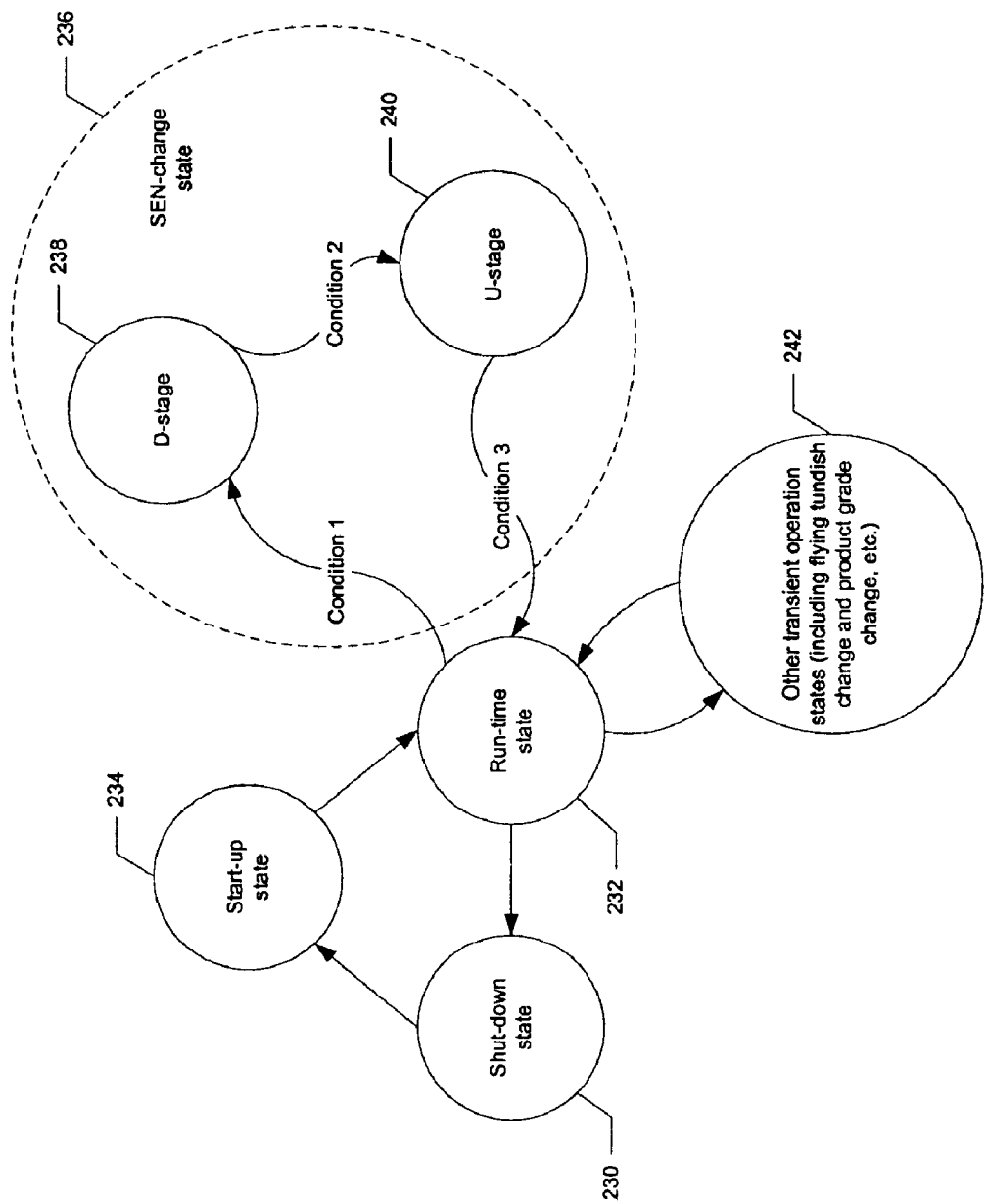
FIG. 16 is a graph to illustrate system states and state changes to integrate start-up operation monitoring, run-time operation monitoring and transient operation monitoring in an integrated computer system.

Firstly, online monitoring of SEN changes requires the process state of the SEN change to be determined while the casting process is running. As previously described, in a continuous casting process, a long-term continuous, run-time operation often follows a start-up operation, during which transient operations such as SEN changes, flying tundish changes, product grade changes, etc. are performed. One of the features developed for the online system is the ability to monitor start-up operations, run-time operations and transient operations in an integrated computer system. A rule-based process state determination function is developed at 182 (FIG. 14) in the process monitoring module to determine the state currently applied to the process based on the available real-time data, and automatically select the suitable model for process monitoring. Referring to FIG. 16, multiple process states are defined as shut-down state 230, run-time state 232, start-up state 234 and SEN change state 236 that consists of D-stage 238 and U-stage 240. At each state, the corresponding calculations are performed, for example, the MPCA model calculations disclosed in this invention are performed at the SEN change state, normal PCA calculations (described by Vaculik et al in U.S. Pat. No. 6,564,119) are performed at the run-time state, and no calculation is performed at the shut-down state. Depending on current operating conditions (determined by casting speed, strand length and so on), the system is able to move from one state to another and, hence, monitor caster start-up operation, run-time operation, SEN change operation or other transient operations. In order to determine the SEN change state, a piece of switch hardware, for example, a push button, named SEN change button, is installed on the operator's control panel and standard operation procedures (SOP) are revised to ensure that the SEN change button is pushed when operators start to decrease the casting speed for an SEN change. The push button signal is made available to the online monitoring system. Thus, as illustrated in FIG. 16, the system moves from the run-time state to the SEN change D-stage state when Condition.1 is applied, that is, the casting speed is below $V_{max}$ after the SEN change button is pushed. The system moves from the D-stage to U-stage when Condition.2 is applied, that is, the step change of the casting speed is greater than +0.01 meters/minute after the casting speed reaches the SEN change holding speed; and it further moves back to the run-time state when Condition.3: the length of steel strand cast within the U-stage reaches 2.4 meters, is applied. It is worth noting that very similar conditions can be applied to determine the stage of other caster transient operations 242, such as flying tundish changes and product grade changes.

Secondly, online monitoring of an SEN change requires the casting speed decrease monotonically during the D-stage for the purpose of process trajectory synchronization, that is, $$dV/dt \leq 0$$

where dV/dt is the gradient of the casting speed during the SEN change D-stage. In a preferred embodiment of this invention, this prerequisite is satisfied by a piece of programming codes that resides in a programmable logic controller to automatically reduce the casting speed to the operator-specified SEN change holding speed after the SEN change button is pushed.

One skilled in the art will realize that the aforementioned solutions to the prerequisites of online SEN change monitoring are not unique, for example, the SOP can be modified in order to enforce operators to continuously decrease the casting speed to satisfy the second prerequisite. Therefore, this invention is not limited thereto.

Seamless HMI Transition Between Process States

As previously indicated, the online monitoring system is able to monitor a continuous casting process in different process states, where process alarms and the identified process variables that are most likely related to the alarms are sent to operators by the online monitoring system through a set of well-designed HMI screens. One important feature in this invention is that the change of above process states is transparent and seamless to operators. For this purpose, a set of identical HMI screens are defined to provide operators with the monitoring information (including alarms and the process variables that most likely caused the alarms) and the operation information (including current process state, heat and slab identification number, product grade, casting speed and strand length, thermocouple temperatures, etc.) for all process states. In addition, the SPE and HT calculated in each process state are scaled to [0,1] with respect to their corresponding control limits. Thus, the control limits of both the scaled SPE and HT are consolidated to one for all process states.

Ability to Handle Missing Data in Real-Time

Real-time missing data are of a crucial issue to the success of online process monitoring of SEN changes. The missing data may arise from three sources in the online monitoring system of this invention. Firstly, some invalid readings from sensors may occur due to certain reasons including sensor failures, data acquisition system malfunction, or computer network problems. Secondly, missing data may be introduced to the monitoring system by the process trajectory synchronization scheme applied in SEN change D-stage, where the missing data are generated at the beginning of an SEN change D-stage if the steady-state speed of the SEN change is less than $V_{max}$ and/or at the end of the D-stage if the hold speed of the SEN change is greater than $V_{min}$ (refer to FIG. 10). Finally, missing data may exist in some thermocouple temperatures when the caster is operated in the intermediate-casting or narrow-casting mode, where these thermocouples no longer represent the temperature of the mold due to the mold width change.

One of the features developed for the online system is the ability to continue monitoring SEN changes in the absence of a portion of real-time sensor measurements. Once missing data are found by the online system, they are handled by the following rules and methods:

If missing data is found in the casting speed, then the missing data is replaced by its previous value. However, if the previous value is also flagged as missing, then the system moves to the idle state and no MPCA calculation is performed for SEN change monitoring, since the casting speed is considered critical to the success of online implementation.

If missing data are found in other selected process variables, they are compensated for as follows:
- in the trajectory synchronization at 190 (FIG. 14), the synchronized data is set to an identifiable number and flagged as "missing" if it is interpolated from any missing data;
- in the model calculation at 196 (FIG. 14), the missing data are replaced by the model-based estimation and then passed through the model calculations; the estimation algorithm is called projection to model plane, which is described by Nelson et al in Chemometrics and Intelligent Laboratory systems, volume 35, 1996.

Quick Advisory Information for Fault Diagnosis

Identifying the process variables that are most likely related to a predicted transient-cast breakout at 198 (FIG. 14) is an important feature in caster SEN change online monitoring system. When an alarm is generated, it is important to quickly inform operators what may be causing the alarm such that further diagnosis can be performed and/or appropriate control actions can be conducted to avoid the actual occurrence of the predicted transient-cast breakout.

Figure 17A:
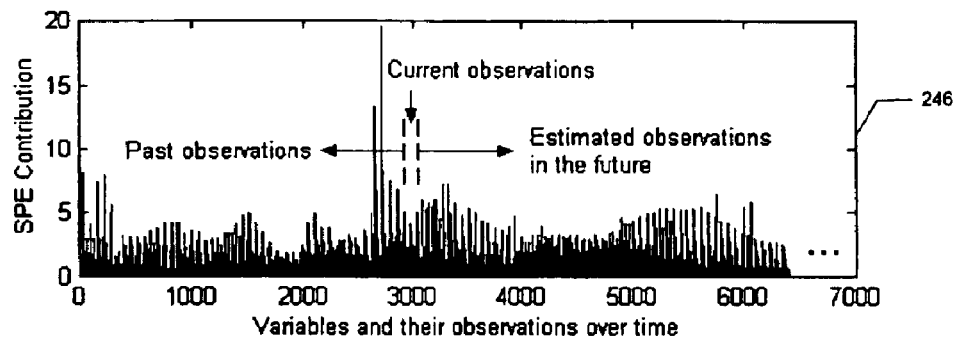
FIG. 17a is a graph showing a prior art contribution plot.
Figure 17B:
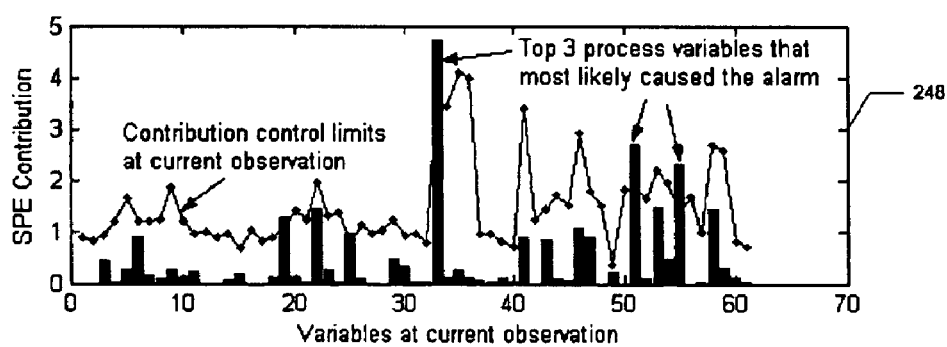
FIG. 17b is a graph to demonstrate a modified contribution plot used in this invention to identify the process variables that are most likely related to the predicted breakout.

In the prior art of multivariate statistical process monitoring, such process diagnosis information is normally derived from contribution plots. A traditional PCA contribution plot includes all process variables involved in the model calculation and the most likely process variables causing the alarms are identified by their largest contributions. However, as illustrated by 246 in FIG. 17(*a*), such a contribution plot may suffer from a huge number of process variables and their observations over time in the MPCA model (in one preferred embodiment of this invention, there are a total of 60 process variables and 120 observations over SEN change duration for each process variable) and won't provide helpful operating guidance to operators in a quick and clear manner. Therefore, a modified contribution plot is developed in this invention, where only the observations that describe the current, instantaneous operating conditions are presented to operators. It is expected that, at a current observation, a certain process variable with a high contribution to SPE or HT statistic in all normal SEN changes within the modeling dataset should also have a high contribution in a new SEN change operation. Thus, under an alarm situation, if one process variable has a higher contribution at the current observation than what it usually has in normal operations, it is the most likely process variable that caused the alarm. Based on the contribution control limits previously developed at 98 in FIG. 4, the process variables that most likely caused the alarms during an SEN change are then identified by the highest ratio of contributions at the current observation to their corresponding control limit, which is shown by 248 of FIG. 17(*b*).

Online Model Tuning Through Adjustable Parameters

In this invention, the control limits of SPE, HT statistics and the contributions of process variables to SPE and HT statistics provide the confidence intervals to determine whether an SEN change, or a certain process variable, is normal in comparison with the historical benchmark. Such control limits are calculated based on a large number of historical operating data, instead of some known probability distribution functions in theory. Although the selected historical data are expected to span as much of normal operation regions as possible, they can not cover 100% operation regions due to the limited size of available historical data. Furthermore, the normal operating region may drift as time goes by. All these issues have an large impact on the accuracy of the calculated control limits at the time when a model is built, and may result in a number of false or failed alarms.

One feature developed for this invention is that a set of adjustable model parameters are available as handles for online model tuning. The said parameters refer to the multiplier "g", a constant that is used to define the control limits for SPE, HT performance indices and their contributions. In a preferred embodiment of this invention, different values of g are assigned to obtain SPE and HT control limits in SEN change D-stage and U-stage, respectively. Based on the model performance, such as false and failed alarm rate, the parameter g can be tuned online, in real-time. If the desired model performance is however not achieved by tuning the parameter g, then it indicates that the model may need to be re-built.

INDUSTRIAL APPLICABILITY

In summary, the realization of a caster SEN change online monitoring system using multivariable statistical models of the process requires the availability of the process measurements described above to a computer system. The computer system is used to perform MPCA calculations to monitor an SEN change currently in operation, predict an impending transient-cast breakout and notify operators of any alarms of predicted breakouts. The multivariable statistical models are developed offline based on the carefully selected historical data using MPCA technology, in which an unique two-stage process trajectory synchronization scheme is applied. The models are validated by evaluating the false alarm rate, failed alarm rate and the lead-time to breakout before it can be applied online, in real-time.

Although this invention has been described with reference of monitoring an SEN change of a continuous casting process and predicting transient-cast breakouts during such an SEN change, it is not limited thereto. In particular, this invention can be applied to other caster transient operations such as flying tundish changes, product grade changes and so on to predict transient-cast breakouts occurring in the above operations. It will be understood that several variants may be made to the above-described embodiment of the invention, within the scope of the appended claims.

What is claimed is:

1. A method for online monitoring of transient operations in a continuous caster and predicting an impending transient-cast breakout or other process abnormality, comprising the following steps:

retrieving historical process data of a plurality of selected process variables during a pre-defined transient operation duration, the resulting historical process data covering most of normal transient operation regions and being used to construct a modeling dataset;

dividing modeling data in each transient operation into two stages, and synchronizing the modeling data separately with respect to a set of synchronization scales pre-defined by casting speed and casting strand length, respectively, in said two stages to define a series of observations forming a synchronized modeling dataset;

performing a multi-way principal component analysis (MPCA) on said synchronized modeling dataset to develop a multivariate statistical model to benchmark normal transient operations; and calculating a loading matrix P, and values of principal components for each transient operation in the modeling dataset;

computing test statistics at each observation over a pre-defined transient operation duration, for each transient operation in the modeling dataset, based on the multivariate statistical model;

determining control limits for said test statistics and their contributions from each selected process variable;

acquiring on-line process data of each selected process variable from a pre-defined start point to a current time t, in a new transient operation to be monitored;

synchronizing the acquired online data based on the synchronization scales defined in the two stages, and predicting future process trajectories for the rest of said transient operation duration, namely, from said current time t to a predefined end point for said transient operation duration to create complete process trajectories;

computing test statistics based on the multivariate statistical model for the resulting complete process trajectories of said new transient operation;

comparing the test statistics computed from said new transient operation to their corresponding control limits; and generating at least one indication signal indicating whether said new transient operation is statistically different from its historical benchmark of normal operation in a continuous casting process.

2. A method according to claim 1 in which an alarm signal is generated when test statistics exceed their control limits for more than a pre-defined number of consecutive sampling intervals, said alarm signal being indicative of an impending transient-cast breakout or other process abnormality.

3. A method according to claim 2 in which a list of process variables that are most likely contributors to the alarm signal is generated.

4. A method according to claim 1, in which a transient operation is characterized by slowing down the casting speed, the casting speed of the continuous caster remaining unchanged for a short period of time and finally the casting speed is ramping up gradually back to its normal operating conditions over several minutes.

5. A method according to claim 4 in which the transient operations include SEN changes, flying tundish changes, and product grade changes of a continuous caster.

6. The method according to claim 1, in which the process variables of a continuous caster are selected from the group comprising: mold thermocouple readings, temperature differences between pre-defined thermocouple pairs, stopper rod position, tundish car net weight, mold cooling water flows, temperature difference between inlet and outlet mold cooling water, and heat flux transferred through each mold face.

7. The method according to claim 6, wherein the heat flux transferred through each mold face of a continuous caster is calculated from the temperature difference between the inlet and the outlet cooling water flows for each mold face.

8. A method according to claim 1, in which the duration of a transient operation in a continuous casting process is defined by two stages, namely;

a D-stage beginning at the said start point when the casting speed is decreased for a transient operation and ending at an end point when the casting speed is increased from a pre-defined holding speed; and a U-stage beginning at the end of D-stage, and ending at an end point where the length of steel strand cast in U-stage reaches a predetermined length.

9. The method according to claim 8, in which said casting speed decreases continuously in the D-stage to a desired value which is controlled by an automatic controller.

10. A method according to claim 8, in which the length of steel strand cast in U-stage is equal to 2.4 meters.

11. A method according to claim 8, in which said length of steel strand is calculated as the integral of the casting speed over time, and it increases monotonically in the U-stage.

12. A method according to claim 8, in which process trajectories in D-stage are synchronized based on a set of uniform synchronization scales defined by using the casting speed, and missing data exist at the beginning and/or the end of D-stage due to the applied process trajectory synchronization method.

13. A method according to claim 8, in which process trajectories in U-stage are synchronized based on a set of non-uniform synchronization scales defined by using the casting strand length such that an online monitoring calculation is conducted more frequently at the beginning of the U-stage than at the end of the U-stage.

14. A method according to claim 1, in which said multivariate statistical model is developed using MPCA technology and the number of principal components is determined such that a predetermined percentage of operation-to-operation variance existing in the historical modeling dataset has been captured.

15. A method according to claim 1 in which the test statistics are selected from the group consisting of Squared Prediction Error (SPE) and "Hotelling T" (HT).

16. A method according to claim 1, in which said control limits for said test statistics and contributions of each selected process variable are determined based on the historical data in the modeling dataset, and an adjustable multiplier is used online to adjust said control limits.

17. A method according to claim 16, in which said multiplier for the control limits of said test statistics has different values in the D- and U-stage.

18. A method according to claim 3, in which the process variables that are most likely related to the predicted breakouts or process abnormalities are identified by high contribution values, in comparison with their corresponding control limits, at the most current observation.

19. A real-time system for online monitoring of transient operations in a continuous caster and predicting an impending transient-cast breakout or other process abnormality, comprising:

a plurality of measurement sensors for obtaining real-time process data of a continuous caster;

a data access module to acquire said real-time process data from said sensors, and supply them to other modules in the system, as required;

a process state determination module to determine a process state selected from the following: start-up state, shut-down state, run-time state, transient operation state and to select a model calculation module to monitor operations of a continuous caster;

a model calculation module, selected by the process state determination module according to said determined process state, to receive said real-time process data, to perform MPCA calculations and to compute test statistics; and a human machine interface for displaying current transient operating conditions according to the determined process state.

20. A system according to claim 19, in which said transient operation state includes submerged entry nozzle (SEN) changes, flying tundish changes, and product grade changes.

21. A system according to claim 19, in which said human machine interface provides operating information including any one of the following: identification of said process state, slab tracking identifiers, real-time sensor readings and monitoring information including test statistics, control limits associated with the test statistics and identified process variables that are most likely contributors to generate alarms.

22. A system according to claim 21, in which said test statistics and contribution values are scaled to [0,1] with respect to corresponding control limits over a defined transient operation duration.

23. A real-time system for online monitoring of transient operations in a continuous caster and predicting an impending transient-cast breakout or other process abnormality comprising:

a model development module to receive and divide modeling data from transient operations into two stages, and synchronize the modeling data separately with respect to a set of synchronization scales pre-defined by casting speed and casting strand length, respectively, in said two stages, said model development module defining a series of observations which form a synchronized modeling dataset; to perform a multi-way principal component analysis (MPCA) on said synchronized modeling dataset to develop a multivariate statistical model, which captures operation—operation variance existing in historical data to benchmark normal transient operations; to calculate a loading matrix P, and values of principal components for each transient operation in the modeling dataset; to compute test statistics at each observation over a pre-defined transient operation duration, for each transient operation in the modeling dataset, based on the multivariate statistical model; and to determine control limits for said test statistics and their contributions from selected process variables;

a plurality of measurement sensors for acquiring on-line process data of selected process variables from a pre-defined start point to a current time t in a new transient operation being monitored;

a synchronization module to synchronize the acquired online process data based on the synchronization scales defined in the two stages, and predict future process trajectories for the rest of said transient operation duration, namely from said current time t to a pre-defined end point for said transient operation duration to create complete process trajectories;

a calculation module to compute test statistics based on the multivariate statistical model for the resulting complete process trajectories of said new transient operation and to compare the test statistics computed from said new transient operation to their corresponding control limits; and a human machine interface for said displaying current transient operation conditions.

24. A system according to claim 23 having an alarm for generating an alarm signal when test statistics exceed their control limits for more than a predetermined number of consecutive sampling intervals, said alarm signal being indicative of an impending transient-cast breakout or other process abnormality.

25. A system according to claim 24 in which the human machine interface presents the alarm signal.

26. A system according to claim 24 in which the human machine interface displays a list of process variables that are most likely contributors to the alarm.

27. A system according to claim 23 in which the model development module divides the modeling data in each transient operation into two stages, namely:

a D-stage beginning at the said start point when the casting speed is decreased for a transient operation and ending at an end point when the casting speed is increased from a pre-defined holding speed; and a U-stage beginning at the end of D-stage, and ending at an end point where the length of steel strand cast in U-stage reaches a predetermined length.

28. A system according to claim 23 having an adjustable multiplier to adjust control limits online.

29. A system according to claim 23 having means for handling missing data generated by sensor failures, non-functional thermocouples due to changes of continuous caster mold width, and by said synchronization module.

* * * * *